United States Patent
Nakamura et al.

(10) Patent No.: US 6,770,880 B2
(45) Date of Patent: Aug. 3, 2004

(54) INFRARED IMAGING APPARATUS

(75) Inventors: Osamu Nakamura, Kawasaki (JP);
Hiroki Shimomae, Kawasaki (JP);
Masaki Kamata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 09/942,212

(22) Filed: Aug. 29, 2001

(65) Prior Publication Data

US 2002/0117621 A1 Aug. 29, 2002

(30) Foreign Application Priority Data

Feb. 26, 2001 (JP) ........................................ 2001-049900

(51) Int. Cl.$^7$ ................................................. G01J 5/00
(52) U.S. Cl. ..................... 250/330; 250/332; 250/341.5; 250/252.1
(58) Field of Search ............................... 250/330, 332, 250/334, 252.1, 339.09, 341.5

(56) References Cited

U.S. PATENT DOCUMENTS

| | | | |
|---|---|---|---|
| 5,675,149 A | * 10/1997 | Wood et al. | 250/332 |
| 5,811,808 A | * 9/1998 | Cannata et al. | 250/332 |
| 5,994,701 A | * 11/1999 | Tsuchimoto et al. | 250/351 |
| 6,236,046 B1 | * 5/2001 | Watabe et al. | 250/338.1 |
| 6,465,785 B1 | * 10/2002 | McManus | 250/338.1 |
| 2002/0030163 A1 | * 3/2002 | Zhang | 250/330 |
| 2003/0057371 A1 | * 3/2003 | Wood | 250/330 |

FOREIGN PATENT DOCUMENTS

| | | |
|---|---|---|
| JP | 02-211781 | 8/1990 |
| JP | 05-292403 | 11/1993 |
| JP | 10-160566 | 6/1998 |

* cited by examiner

*Primary Examiner*—Albert Gagliardi
(74) *Attorney, Agent, or Firm*—Katten Muchin Zavis Rosenman

(57) ABSTRACT

An infrared imaging apparatus is used for carrying out shading correction of picture data obtained as a result of an image-taking process using a camera head including an optical system, a plurality of detector elements and a container for accommodating the detector elements. The apparatus includes a first correction unit for creating corrected-sensitivity picture data by correction of shading components caused by the optical system to produce uniform scene components included in the picture data obtained as a result of an image-taking process of a uniform scene; a storage unit for storing a housing response profile for correcting a housing-shading component caused by infrared rays radiated by the optical system and the container for each of the detector elements; and a second correction unit for creating corrected-housing-shading picture data by correction of housing-shading components based on the corrected-sensitivity picture data and the housing response profile for each of the detector elements.

11 Claims, 34 Drawing Sheets

F I G. 1
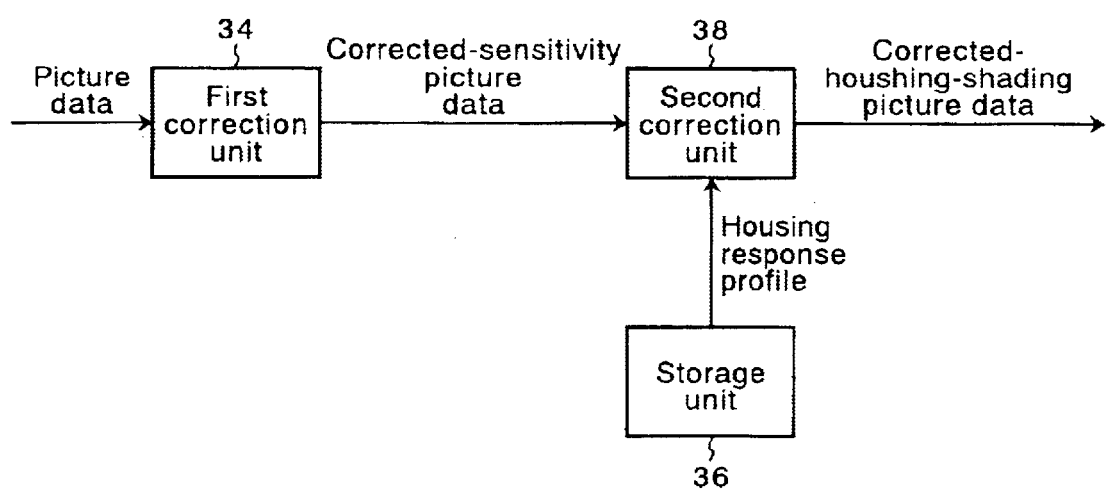

F I G. 7
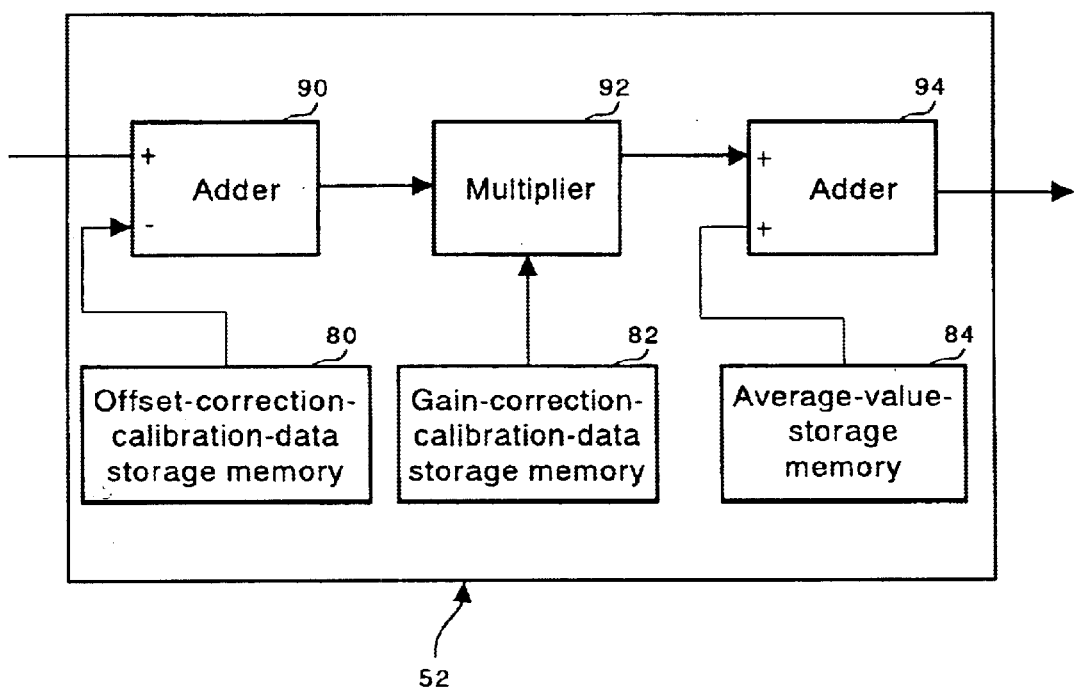

Luminance distribution

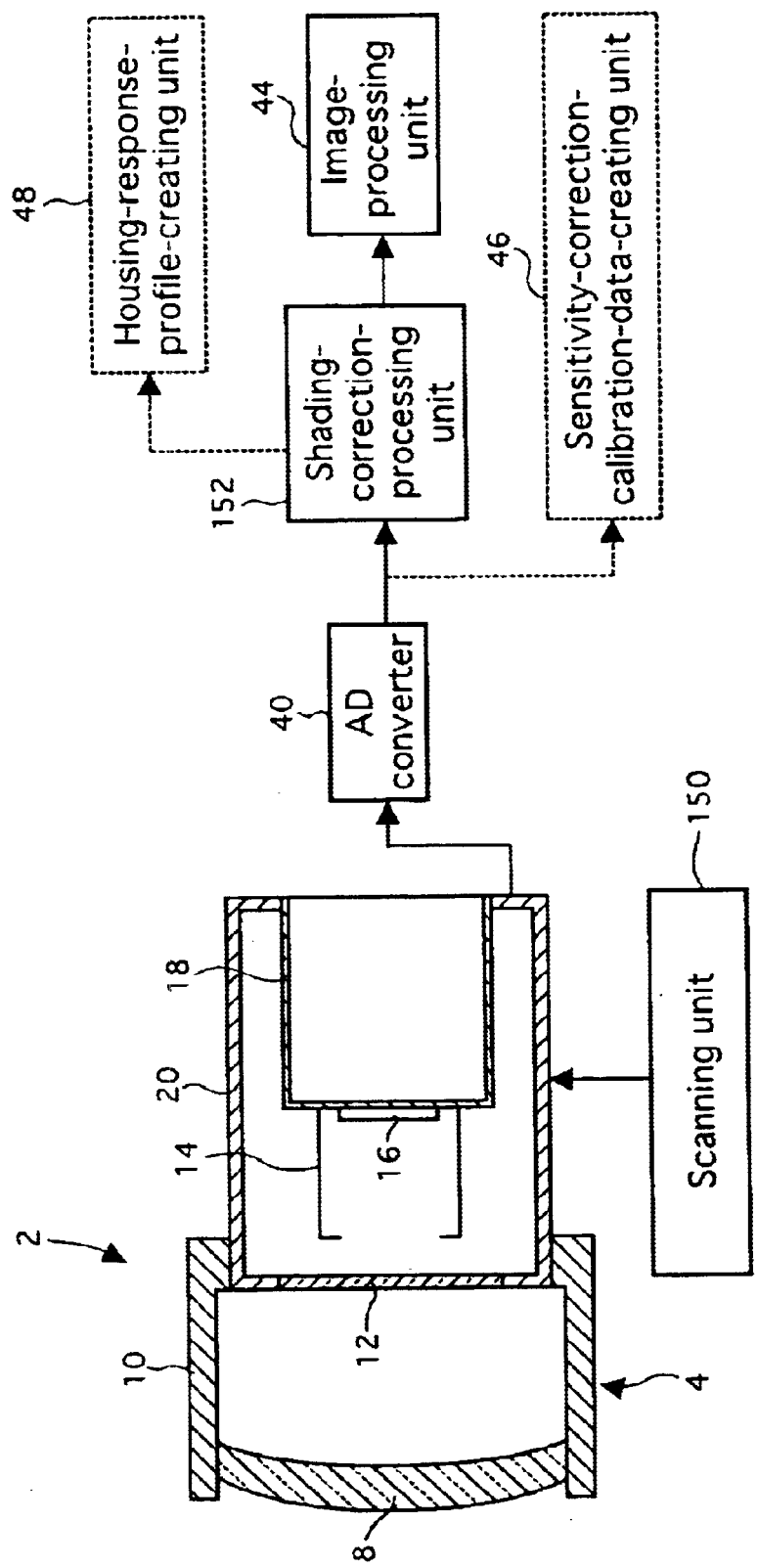

F I G. 3 6
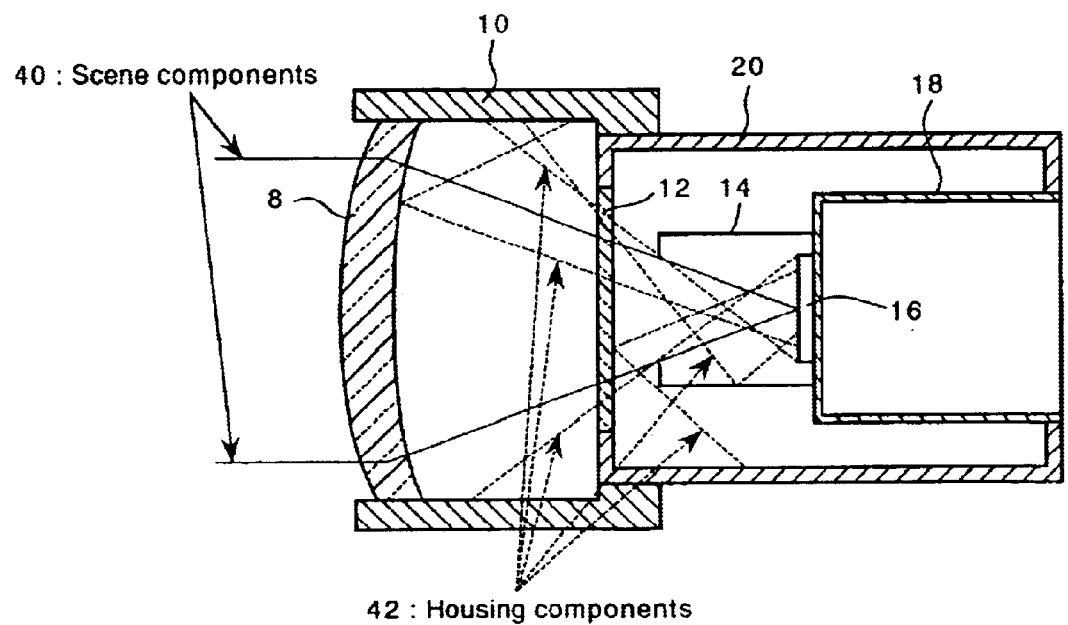

INFRARED IMAGING APPARATUS

BACKGROUND OF THE INVENTION

1. Field of the Invention

In general, the present invention relates to an infrared imaging apparatus and, more particularly, relates to correction of shading included in data of a picture taken by infrared imaging apparatus.

2. Description of the Related Art

Each substance radiates substance-temperature-dependent electromagnetic waves caused by motions of atoms or molecules on the surface of the substance unless the temperature of the substance is equal to the absolute zero. The maximum wavelength of electromagnetic waves radiated by many substances on the earth has a value in an infrared range. An infrared imaging apparatus is an apparatus for carrying out image processing by detection of infrared rays. In many cases, an infrared imaging apparatus is used in light reception equipment. One of most outstanding features of an infrared imaging apparatus is a characteristic that allows such equipment to be designed into small and light one. In general, such light-receiving equipment is referred to as a passive system. On the other hand, a system comprising a set of a transmission apparatus and a reception apparatus is known as an active system. Since an infrared passive system does not radiate an electromagnetic wave by using a transmission apparatus as a radar does, such a system has a characteristic of high concealability. For this reason, such a system has been developed for military purposes and has become the base of development of infrared technologies. At the present time, a number of application products centered at an image processing apparatus are available in the market as consumer products. The reception apparatus of the infrared system comprises a camera head for detecting infrared rays and converting the infrared rays into electrical signals, an A/D converter for converting an analog signal into digital data and an image-processing unit for processing the digital data representing an image in accordance with an application.

FIG. 32 is a diagram showing the general configuration of the camera head. As shown in the figure, the camera head 2 comprises an optical system 4 and an infrared detector 6. The optical system 4 comprises a lens 8 and a lens housing 10. The lens 8 condenses infrared rays. The lens housing 10 plays roles of supporting the lens 8 and preventing reflection of infrared rays by absorption of the infrared rays introduced to the inside of the lens housing 10. Such reflection is a cause of noise. The infrared detector 6 comprises a window 12, a cold shield 14, an infrared sensor 16, an inner shell 18 and an outer shell 20. The window 12 is a window for passing through infrared rays. The cold shield 14 plays a role of reducing the quantity of an unnecessary infrared ray hitting the infrared sensor 16. The infrared sensor 16 plays a role of outputting electrical signals with a level proportional to the intensity of incident infrared energy. The inner shell 18 and the outer shell 20 play a role of accommodating the infrared sensor 16.

FIG. 33 is a diagram showing a typical configuration of the camera head 2. The lens 8 shown in the figure comprises a plurality of lenses 8a to 8d. The lens 8a is made of Si while the lens 8b is made of ZnSe. On the other hand, the lens 8c is made of Ge while the lens 8d is made of Si. The window 12 is made of Ge and the cold shield 14 is a metallic plate. The infrared sensor 16 is made of semiconductor such as $Hg_{1-x}Cd_x$, Te or $Pb_{1-x}Sn_xTe$. The inner shell 18 and the outer shell 20 are each made of a metal such as kovar.

FIG. 34 is a diagram showing a typical implementation of the infrared detector 6 shown in FIG. 32. The infrared detector 6 is a vacuum thermal-insulating container having a dual structure comprising the inner shell 18 and the outer shell 20. On a portion of the outer shell 20, the window 12 is provided. On the inner shell 18 facing the window 12, the infrared sensor 16 is mounted. The inner shell 18 of the vacuum thermal-insulating container accommodates refrigerant such as liquid nitrogen. As an alternative, a cryostat 28 adopting a Joule-Thompson law operates at a predetermined temperature. The cold shield 14 is provided so as to enclose the infrared sensor 16. The cold shield 14 reduces the quantity of an unnecessary infrared ray entering the infrared sensor 16. Electrodes of the infrared sensor 16 and their conductor patterns are connected to each other by bonding wires 22 adopting a bonding technique. Infrared rays detected by the infrared sensor 16 is output to an external device as analog electrical signals appearing on lead pins 26 which are connected to semiconductor patterns by bonding wires 24. The analog electrical signals output from the lead pins 26 are each converted by the AD converter into digital data consisting of a predetermined number of bits. The digital data is supplied to the image-processing unit such as an apparatus for keeping track of an observation target or implementing medical treatment. In the image-processing unit, the digital data is subjected to various kinds of image processing.

FIG. 35 is an explanatory diagram used for describing a role played by the cold shield 14. As described above, the cold shield 14 is provided so as to enclose the infrared sensor 16. The inner surface of the cold shield 14 is coated with a black coating material. Baffles 30 are provided on the walls of the inner surface. The baffles 30 each reduce the quantity of an unnecessary infrared ray entering the infrared sensor 16. The cold shield 14 is designed so that infrared rays in a range denoted by reference numeral 32 are condensed by the lens 8 at a position A on the surface of the infrared sensor 16. In general, about a photographed picture output by the camera head 2 infrared rays are incident on the surface of the infrared sensor 16 not in a uniform irradiance distribution even if the picture is taken as a result of photographing a scene or an image-taking object having a uniform distribution of radiation intensities. Instead, a signal output by the infrared sensor 16 shows a quadratic-function distribution with respect to the position of a field of view. This quadratic-function distribution is a phenomenon known as shading. If the shading phenomenon becomes too excessive, an accurate picture of the scene or the objects of image-taking cannot be taken, and the objective of the image-taking cannot be achieved in some cases. In order to reproduce accurate picture information of a scene or another image-taking object by using an image-taking unit, it is necessary to adopt a shading correction method capable of effectively removing only shading components from a signal generated by the infrared sensor 16.

FIG. 36 is an explanatory diagram used for describing the aforementioned shading phenomenon. The shading phenomenon occurring in an infrared imaging apparatus includes two components, namely, a shading component caused by an optical system and a shading component caused by a housing comprising the lens housing 10, the inner shell 18 and the outer shell 20. The shading component caused by the optical system is a shading component due to irradiance distribution which is developed on the surface of the infrared sensor 16 when an image is created by scene components 40 passing through an effective aperture of the optical system. On the other hand, the shading component caused by the housing parts containing the lens housing 10, the inner shell 18 and the outer shell 20 is a housing components 42 incident to the infrared sensor 16. The infrared rays are radiated by the lens housing 10, the inner shell 18 and the outer shell 20 themselves, which constitute the housing as described above. The shading component caused by the housing parts is peculiar to an infrared imaging apparatus and does not exist in a visible image-taking apparatus. The most important problem raised in the shading correction method adopted by the infrared imaging apparatus is how to effectively correct a housing component. As a remark, it should be noted that a housing component is different from a housing-shading component as follows. The housing component is a component of a ray incident to a sensor device. The housing component is originated from the housing parts. On the other hand, the housing-shading component is used in comparison with the shading component caused by the optical system. The housing-shading component is a shading component caused by a housing component. In the following description, a housing-shading component is also referred to as a shading component caused by the housing. As a shading correction method focusing on a shading component caused by the housing parts, the infrared imaging apparatus adopts the following commonly-known technologies.

In accordance with a technology disclosed in Japanese Patent Publication No. Hei 7-32467 and referred to hereafter as prior art 1, the temperature of a lens housing employed in an optical system is measured by using a temperature sensor. A housing component is then computed from the measured temperature and a cubic angular table representing the lens housing's view seen from detector elements. The cubic angular table is stored in a memory. A shading component caused by the housing parts is corrected by subtracting a result of the computation from picture data. A shading component caused by the optical system is corrected by multiplying a result of the subtraction by irradiance distribution data stored in the memory.

In accordance with a technology disclosed in Patent No. 273196 and referred to hereafter as prior art 2, a picture signal of a plurality of lines which is generated by a linear array detector is stored. The picture signal is integrated and averaged for each element of the linear array detector and, by subjecting the averaged picture signal to a low-pass filtering, a shading component is extracted and removed from the original picture signal.

In accordance with a technology disclosed in Japanese Patent Laid-open No. Hei 5-292403 and referred to hereafter as prior art 3, an adjusted focus of an optical system is temporarily shifted to make a picture blurring. By this, even in the case where the radiation intensity of a scene is not distributed uniformly, uniform infrared rays are incident on detector elements and outputs of the detector elements are used as correction data.

In accordance with another technology disclosed in Japanese Patent Laid-open No. Hei 8-223484 and referred to hereafter as prior art 4, while a view axis of an image-taking unit is forcibly driven into a scanning movement, signals output by each infrared detector during a normal image-taking operation are averaged and smoothed. The averaged and smoothed signal is used for continuous shading correction in the normal image-taking operation. This technology is characterized that view axis scanning and signal smoothing are combined to exhibit the same effect as prior art 3. That is to say, by realizing a state equivalent to a case in which a uniform infrared ray is radiated to all detector elements on the average along the time axis even if the distribution of the radiation intensity of the scene is non-uniform, corrected data is obtained. To put it concretely, a deviation of each pixel from an average of all pixels is added to or subtracted from picture data of an object of correction. The deviation is a difference from an average value calculated for all pixels in calibration data created from smoothed data.

However, the prior arts have the following problems.

In accordance with prior art 1, a housing component is computed by using a measured temperature of a lens housing 10 and a cubic angular table representing the lens housing's view seen from detector elements as described above. In the case of the housing component caused by infrareds incident to detector elements from the lens housing 10, there are a number of components that can be calculated so that relatively accurate correction is possible. In the case of the housing component caused by an incident infrared ray originated from infrared detectors/containers such as the window 12, the cold shield 14, the inner shell 18 and the outer shell 20, on the other hand, there are a number of components that are difficult to calculate so that accurate correction by calculation is impossible. A housing component caused by an incident infrared ray from an infrared detector container normally has a level which is not negligible when compared with a housing component originated from infrared rays coming from the lens housing 10. Thus, with prior art 1, the shading component caused by the housing cannot be corrected with a high degree of accuracy and accurate shading correction is thus impossible. In addition, in the case of an infrared imaging apparatus mounted on a movable structure of a gimbal, which is required to have a small size and a fast response such as a missile seeker, for example, prior art 1 also has a problem of deterioration of movable-unit driving performance due to wires added for temperature measurements.

In accordance with prior art 2, an attempt is made to extract a shading component directly from an output of each detecting elements during an image-taking process without the need for a temperature measurement in order to solve the problems encountered in prior art 1. However, the low-pass filtering raises a problem of impossibility to extract an accurate shading component. That is to say, an incident component coming from a scene generally contains a variety of spatial frequency components mixed with each other. It is thus difficult to discriminate a shading component and a scene component from each other by using spatial frequencies. As a result, in actuality, it is difficult to extract only the shading component.

Prior art 3 raises a problem of temporary suspension of the objective to use the image-taking unit by an operation to shift the focus. In addition, prior art 3 also raises a problem of impossibility to implement accurate shading correction due to lost conformity of correction data. The non-conformity of correction data is caused by changes in housing temperature and scene temperature which occur since acquisition of the correction data.

While shading correction is possible, prior art 4 raises a problem of an altered scene picture which is resulted in as follows. If a scene component includes a structural distribution such as a ridge line resembling a brow of a hill, the scene component remains in smoothed data, making the data non-uniform. The non-uniform data is reflected in picture data obtained from correction processing.

SUMMARY OF THE INVENTION

It is thus an object of the present invention to provide an infrared imaging apparatus capable of reproducing an accurate scene picture by carrying out good shading correction even if the scene temperature and/or the housing temperature change.

In accordance with an aspect of the present invention, there is provided an infrared imaging apparatus capable of carrying out shading correction of picture data obtained as a result of an image-taking process using a camera head comprising an optical system, a plurality of detector elements and a container for accommodating said detector elements, said infrared imaging apparatus characterized by including a first correction unit for creating corrected-sensitivity picture data by correction of shading components caused by the optical system to produce uniform scene components included in the picture data obtained as a result of an image-taking process of a uniform scene; a storage unit for storing a housing response profile for correcting a housing shading component caused by infrared rays radiated by the optical system and the container for each of the detector elements; and a second correction unit for creating corrected-housing-shading picture data by correction of housing-shading components based on the corrected-sensitivity picture data and the housing response profile for each of the detector elements.

Preferably, the second correction unit may correct a housing-shading component by executing the steps of assuming that, for each of the detector elements, the corrected-sensitivity picture data of the detector element is a sum of a housing component of the detector element and a second constant representing a scene component where the housing component is a product of a first constant and the housing response profile for the detector element. Then finding the first constant's value that minimizes a total obtained by summing square of a difference of the sum from the corrected-sensitivity picture data related to the detector elements; and subtracting a product of the housing response profile of the detector element and the first constant from the corrected-sensitivity picture data of the particular detector element for each of the detector elements.

The above and other objects, features and advantages of the present invention and the manner of realizing them will become more apparent, and the invention itself will best understood from a careful study of the following description and appended claims with reference to attached drawings showing some preferred embodiments of the invention.

BRIEF DESCRIPTION OF THE DRAWINGS

FIG. 1 is a diagram showing the principle of the invention;

FIG. 7 is a diagram showing the configuration of a sensitivity-correction-processing unit employed in the shading-correction unit shown in FIG. 3;

FIG. 23 is a diagram showing the configuration of an infrared imaging apparatus implemented by a second embodiment of the present invention;

FIG. 36 is a diagram showing shading components.

DESCRIPTION OF THE PREFERRED EMBODIMENTS

Prior to description of preferred embodiments of the present invention, the principle of the invention is described. FIG. 1 is a diagram showing the principle of the present invention. As shown in FIG. 1, an infrared imaging apparatus contains a first correction unit 34, a storage unit 36 and a second correction unit 38. The first correction unit 34 receives picture data taken by a camera head including an optical system, a plurality of detector elements and a container for accommodating the detector elements. When receiving picture data obtained as a result of photographing a uniform scene, the first correction unit 34 creates corrected-sensitivity picture data by correcting shading component caused by the optical system to make scene components included in the picture data uniform. Since shading component caused by the optical system is corrected to make scene components included in the picture data uniform, in the case of a uniform scene, all of scene components in the corrected-sensitivity picture data are same. The storage unit 36 is used for storing a housing response profile for correcting shading components caused by the housing components due to infrared rays radiated from the container for each of the detector elements and the lens-housing. The second correction unit 38 produces corrected-housing-shading picture data by correction of each shading component caused by the housing components based on the corrected-sensitivity picture data for each of the detector elements and the housing response profile. Thus, in the corrected-housing-shading picture data, shading components caused by the housing components is corrected. Various kinds of image processing carried out by the infrared imaging apparatus are based on the corrected-housing-shading picture data.

First Embodiment

Figure 2:
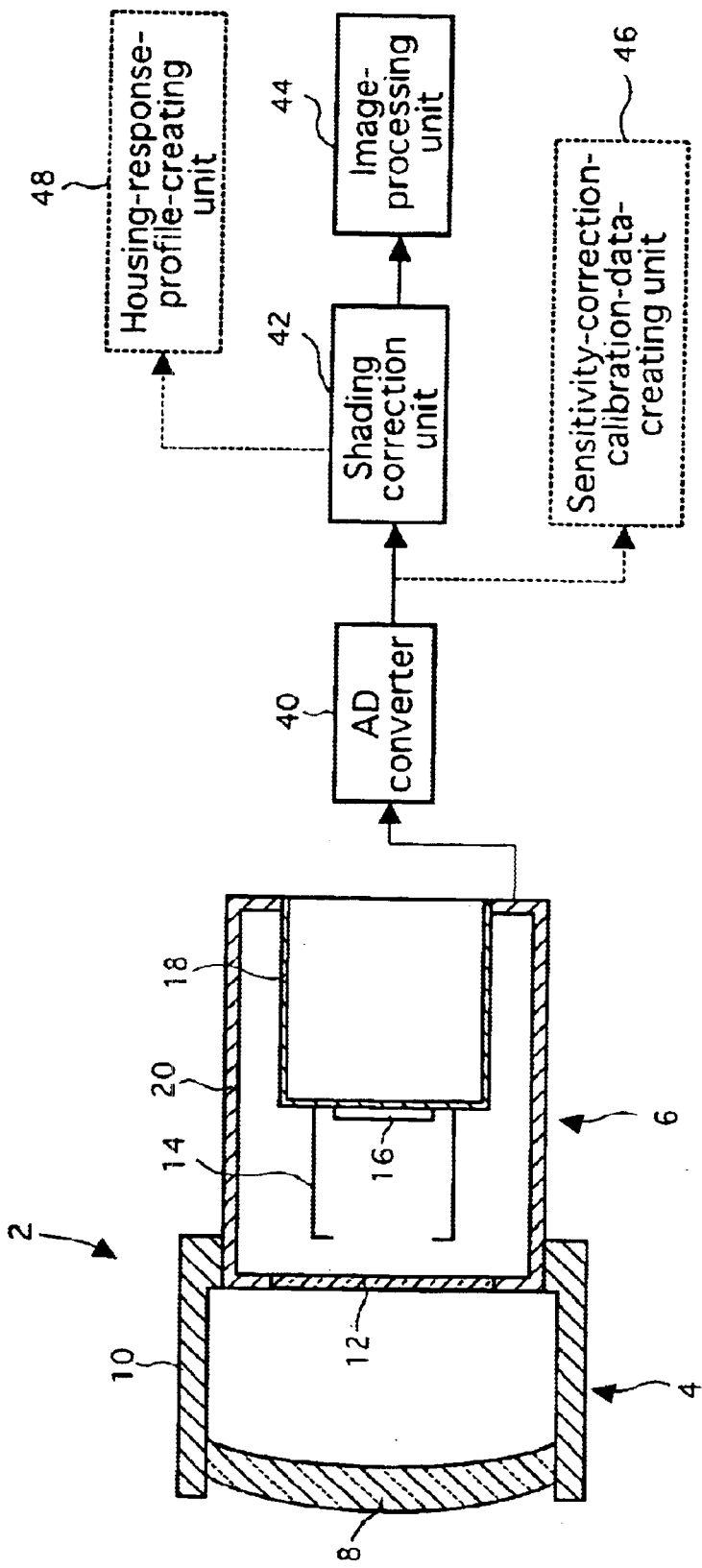
FIG. 2 is a diagram showing the configuration of an infrared imaging apparatus implemented by a first embodiment of the present invention.
Figure 32:
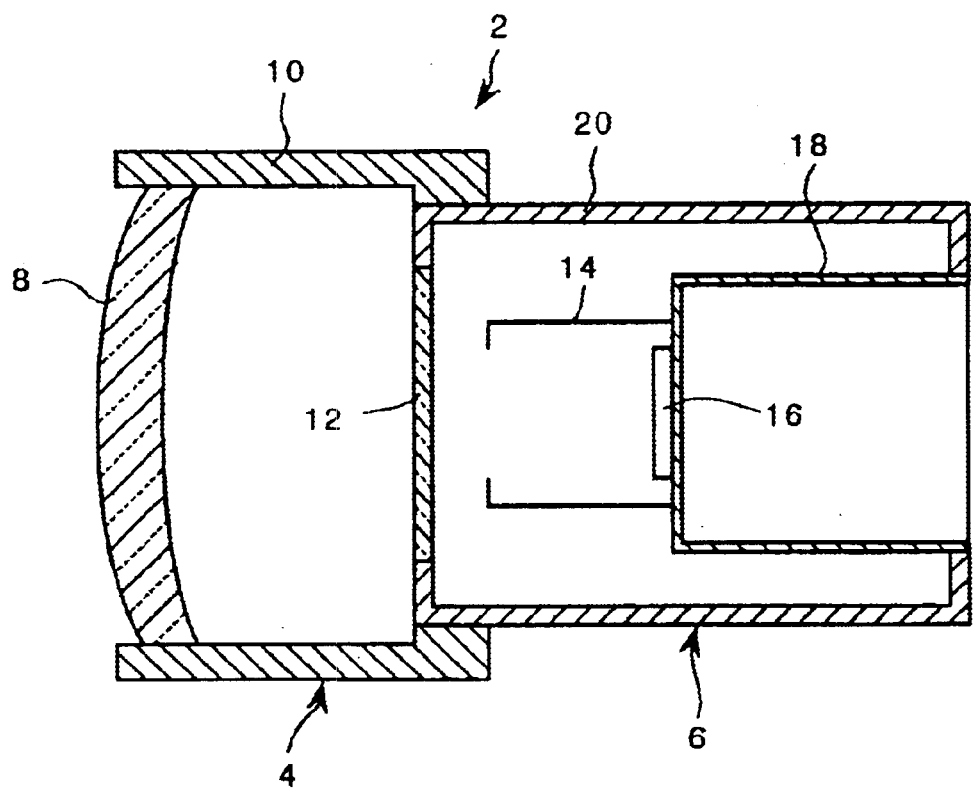
FIG. 32 is a diagram showing the general configuration of a camera head.
Figure 33:
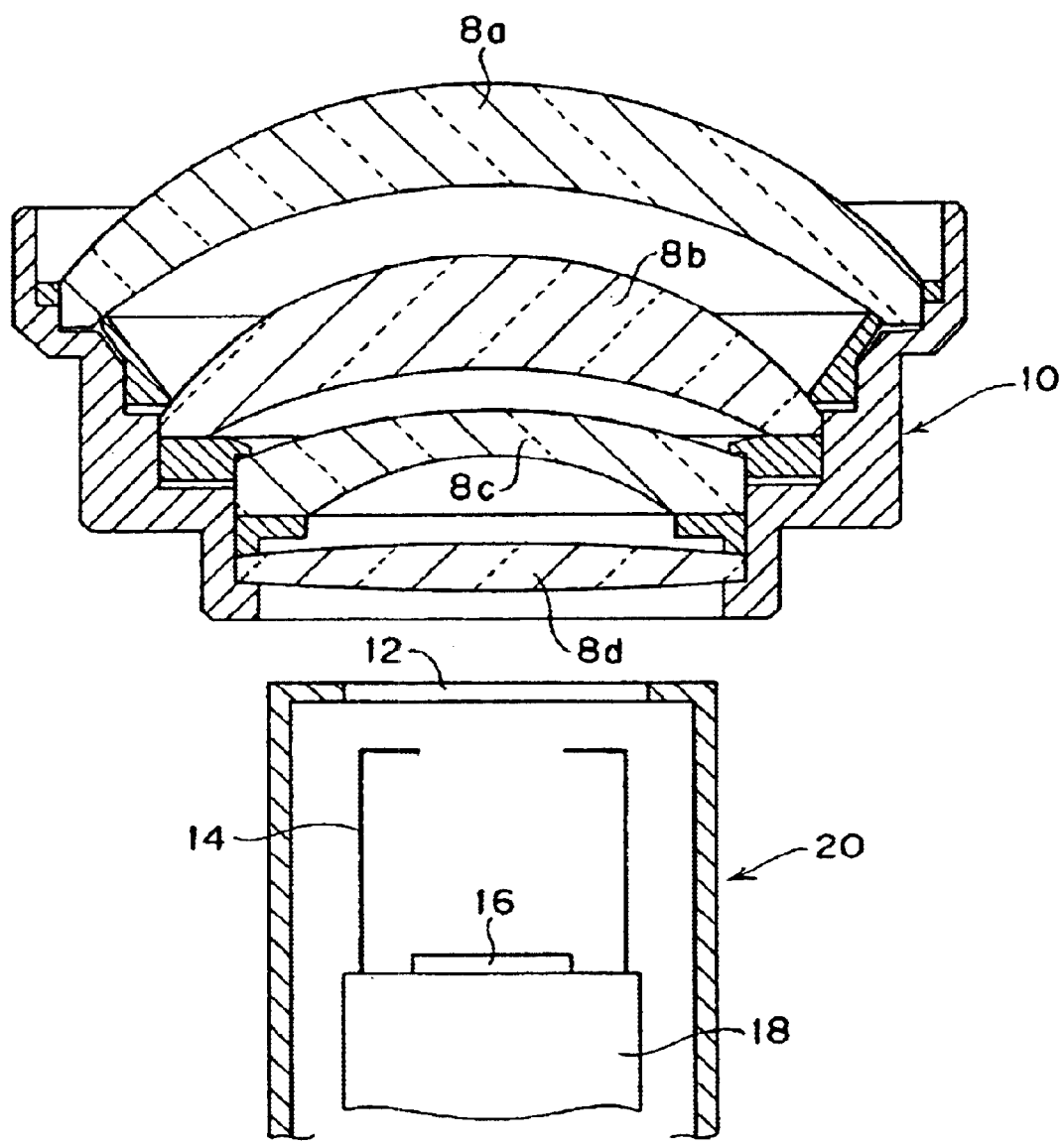
FIG. 33 is a diagram showing a typical configuration of a camera head.
Figure 34:
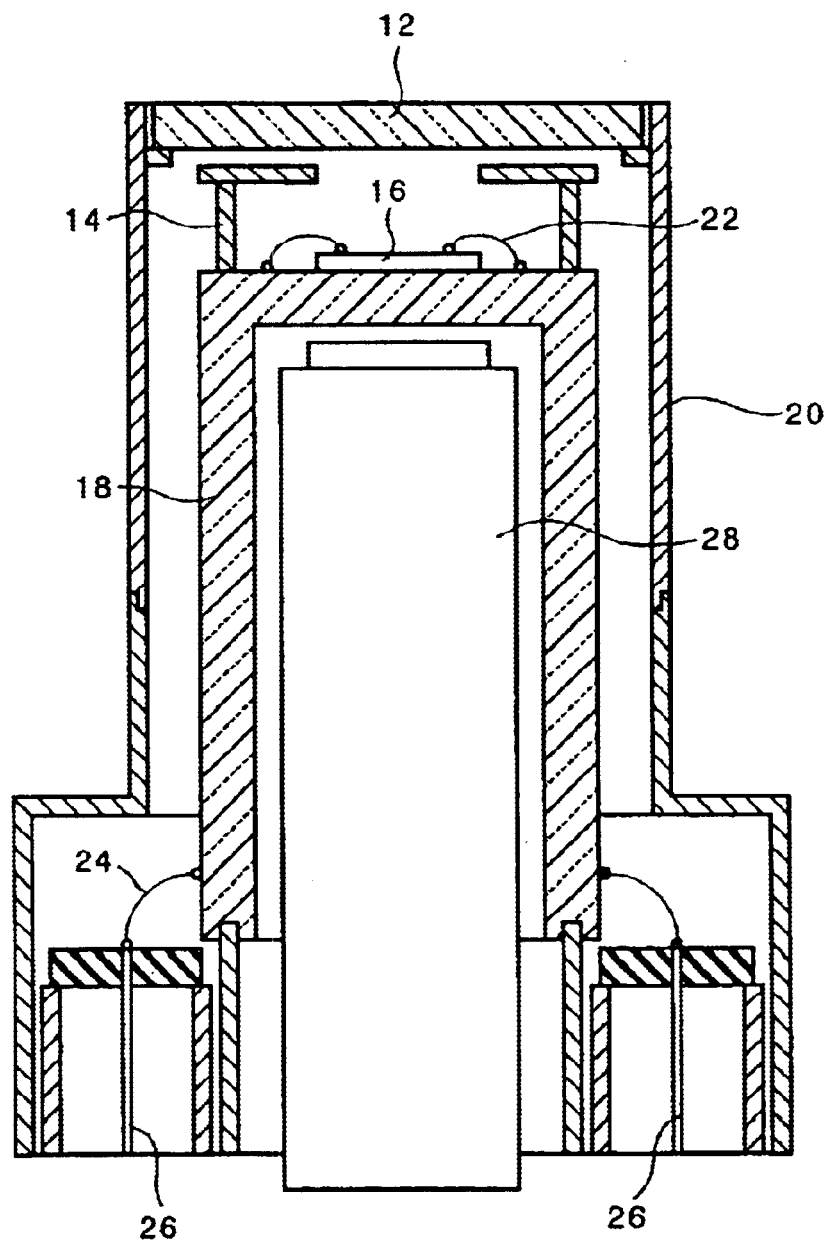
FIG. 34 is a diagram showing an infrared detector employed in the camera head shown in FIG. 32.
Figure 35:
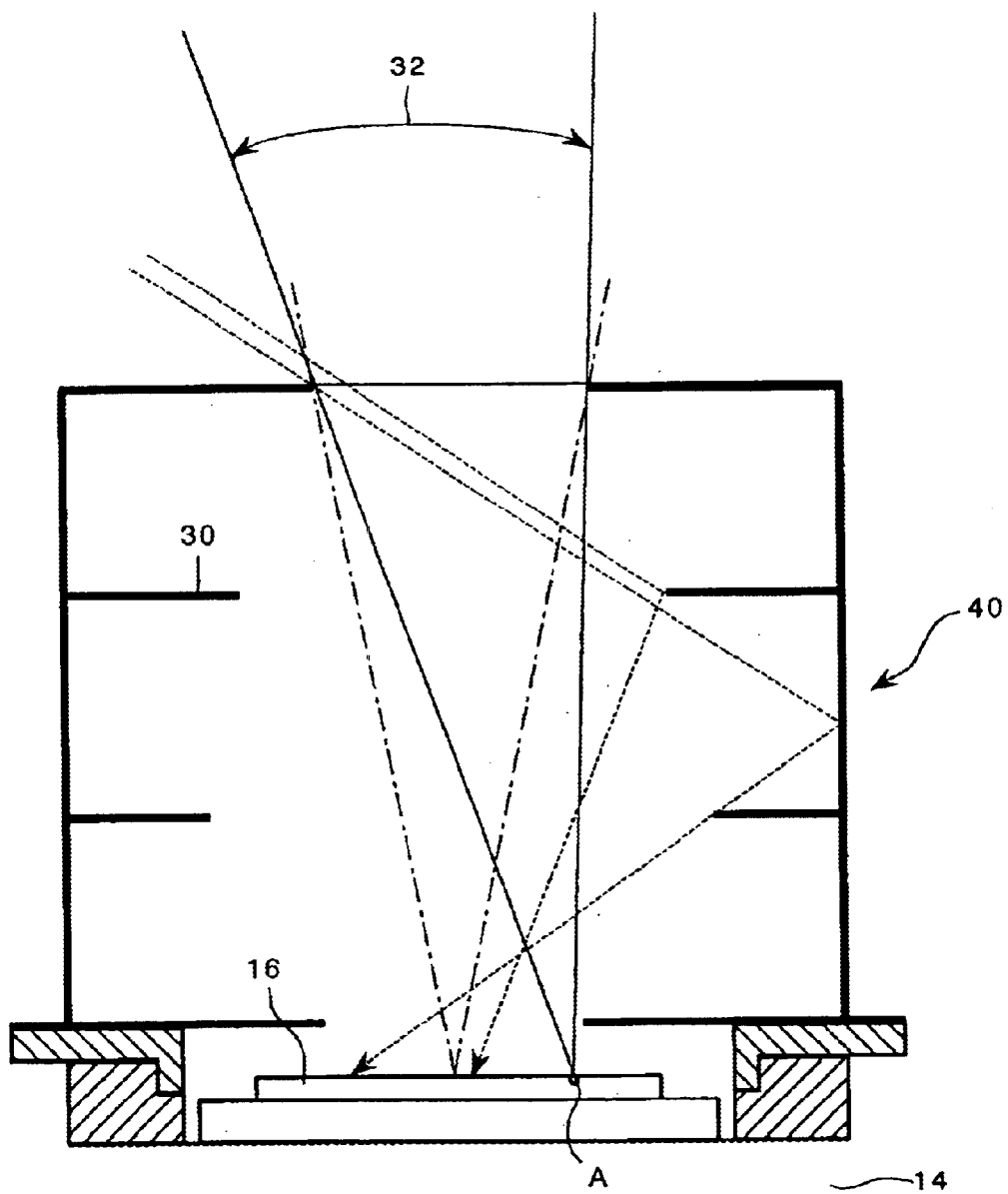
FIG. 35 is an explanatory diagram used for describing a role played by a cold shield.

FIG. 2 is a diagram showing the configuration of an infrared imaging apparatus implemented by a first embodiment of the present invention. Configuration elements of the first embodiment, which are virtually identical with those employed in the camera head 2 shown in FIG. 32, are denoted by the same reference numerals as the latter. This infrared imaging apparatus can be any image-taking apparatus as long as the image-taking apparatus is capable of correcting shading components caused by the optical system, which are included in data of a photographed picture, and capable of eliminating shading components caused by the housing components from the data.

As shown in FIG. 2, the infrared imaging apparatus is comprised of a camera head 2, an AD converter 40, a shading-correction unit 42 and a image-processing unit 44. The camera head 2 is essentially identical with the camera head 2 shown in FIG. 32. However, the infrared imaging apparatus implemented by this embodiment corrects shading components caused by the housing and shading components caused by the optical system. The AD converter 40 converts analog picture signal generated by the infrared sensor 16 into digital picture data consisting of a predetermined number of bits, and supplies the digital picture data to the shading-correction unit 42. The number of bits composing the digital picture data is determined in dependence on the application. A control signal indicating the beginning of a frame and a clock signal synchronized with digital picture data are added to the digital picture data. A frame is fixed period of continuous screen data.

The shading-correction unit 42 has the following functions:

1: Correct shading components caused by the optical system from digital picture data on the basis of sensitivity-correction calibration data for each detector element. Shading components caused by the optical system are corrected by correction of variations in picture signal level, which are caused by differences in physical positions among the detector elements in the case of an input uniform scene, that is, by correction of digital picture data to produce new digital picture data having uniform scene-component levels. A uniform scene is a scene having uniform intensity levels.

2: Find housing components included in corrected-sensitivity picture data by using a housing response profile.

3: Correct shading components caused by the housing, which are detected from corrected-sensitivity picture data.

Comprising components such as a CPU, a main memory, a ROM and a display unit, the image-processing unit 44 carries out image processing according to the application such as tracking of an observation target or a medical care, and displays information on the display unit. The shading-correction unit 42 can also be designed to comprise a CPU, a main memory and a ROM. In this case, a CPU can be shared by the shading-correction unit 42 and the image-processing unit 44. By sharing a CPU with the image-processing unit 44, the shading-correction unit 42 can be implemented with ease at a low cost. A sensitivity-correction-calibration-data-creating unit 46 shown as a dashed-line block in FIG. 2 is a functional unit for executing a pre-operation function preceding an operation to correct shading components caused by the optical system. By the same token, a housing-response-profile-creating unit 48 also shown as a dashed-line block in FIG. 2 is a functional unit for executing a pre-operation function preceding an operation to correct shading components caused by the housing. A pre-operation function is a function not necessarily required during operation. The sensitivity-correction-calibration-data-creating unit 46 and the housing-response-profile-creating unit 48 can be mounted on the infrared imaging apparatus. In the case of this embodiment, however, the sensitivity-correction-calibration-data-creating unit 46 and the housing-response-profile-creating unit 48 are provided as separate units instead of being mounted on the infrared imaging apparatus. In the case of an infrared imaging apparatus installed at a narrow location in an application wherein it is desired to reduce the weight of the infrared imaging apparatus as is the case with a missile seeker or the like, the functions of the sensitivity-correction-calibration-data-creating unit 46 and the housing-response-profile-creating unit 48 are difficult to implement in such an environment. For this reason, the sensitivity-correction-calibration-data-creating unit 46 and the housing-response-profile-creating unit 48 are provided as separate units as is the case with this embodiment.

Provided separately from the infrared imaging apparatus as described above, the sensitivity-correction-calibration-data-creating unit 46 creates sensitivity-correction calibration data to be used in correction of shading components caused by the optical system before the operation of the infrared imaging apparatus. The correction of shading components caused by the optical system is also referred to as sensitivity correction. By the same token, also provided separately from the infrared imaging apparatus as described above, the housing-response-profile-creating unit 48 creates housing response profiles to be used in correction of shading components caused by the housing before the operation of the infrared imaging apparatus.

A housing component is proportional to a housing radiation power. Assume that the radiation power of a scene is 0 and digital picture data for a detector element i is HSi1 at a housing radiation power of W1. In this case, digital picture data HSi2 for the detector element i at a housing radiation power of W2 is HSi2=(W2/W1)×HSi1. The proportional constant of W2/W1 holds true of all detector elements instead of being limited to only the detector element i. Thus, the housing component of a detector element i at any arbitrary temperature in the camera head 2 is a fixed number of times the digital picture data HSi1. It is therefore obvious that the profile needs to be made a fixed number of times the digital picture data HSi1 for a detector element i. However, the actual profile value and the physical dimensions are determined from a point of view showing that their calculation is easy as will be described later.

Figure 3:
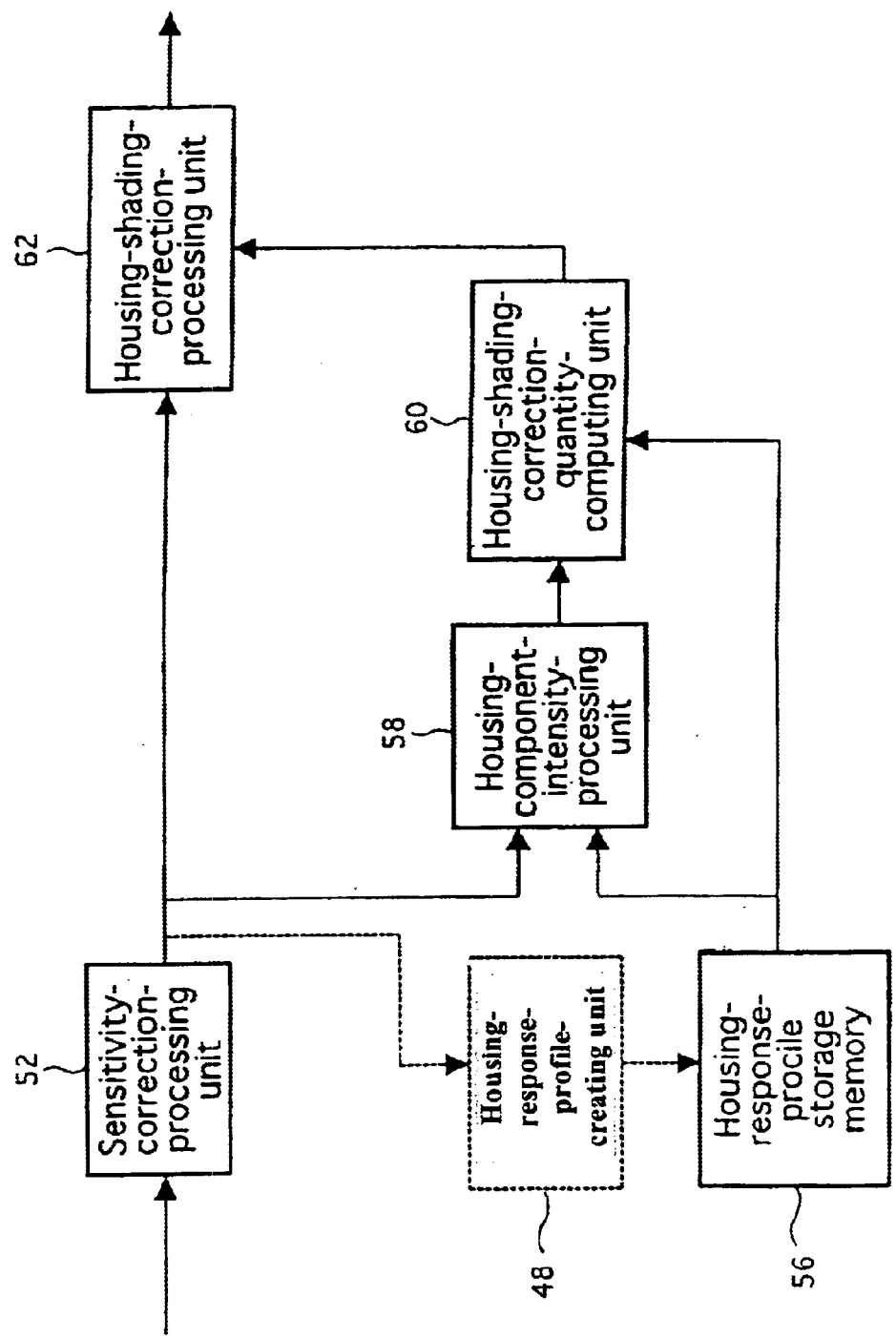
FIG. 3 is a diagram showing the configuration of a shading-correction unit employed in the infrared imaging apparatus shown in FIG. 2.

FIG. 3 is a diagram showing the configuration of the shading-correction unit 42 employed in the infrared imaging apparatus shown in FIG. 2. As shown in FIG. 3, the shading-correction unit 42 is comprised of a sensitivity-correction-processing unit 52, a housing-response-profile storage memory 56, a housing-component-intensity-processing unit 58, a housing-shading-correction-quantity-computing unit 60 and a housing-shading-correction-processing unit 62. As will be described later, the sensitivity-correction-processing unit 52 creates corrected-sensitivity picture data by using the sensitivity-correction calibration data which has been created by the sensitivity-correction-calibration-data-creating unit 46 employed in the infrared imaging apparatus as shown in FIG. 2 prior to the operation of the infrared imaging apparatus.

The sensitivity-correction calibration data includes offset-correction calibration data, gain-correction calibration data and average-value data. Set for each detector element i, the offset-correction calibration data is digital picture data Li including housing components output by each detector element i at $T_a$ and $T_L$ where notation $T_a$ is the temperature of the camera head 2 and notation $T_L$ is a relatively low temperature of a uniform scene. The average value data is an average value L of pieces of digital picture data Li of detector elements i. The gain-correction calibration data gi is set for each detector element i. It is digital picture data Li including housing components output by each detector element i at $T_a$ and $T_H$ where notation $T_a$ is the temperature of the camera head 2 as described above, and notation $T_H$ is a relatively high temperature of a uniform scene. The gain-correction calibration data gi is given by the following equation:

$$gi=(H-L)/(Hi-Li) \quad (1)$$

where notation H is an average value of pieces of digital picture data Hi of detector elements i and notation L is an average value of pieces of digital picture data Li of detector element i.

Figure 4:
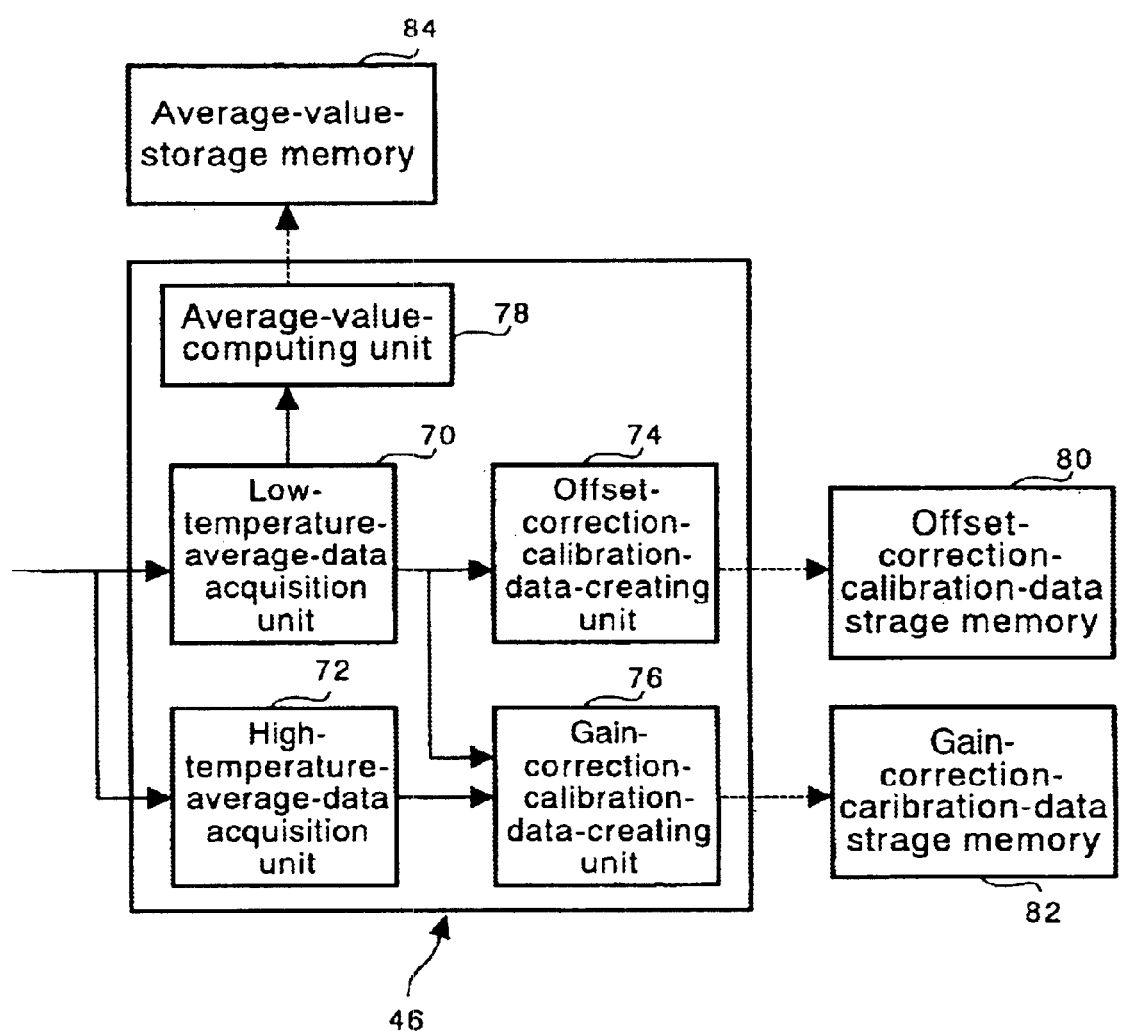
FIG. 4 is a diagram showing the configuration of a sensitivity-correction-calibration-data-creating unit employed in the shading-correction unit shown in FIG. 3.
Figure 5:
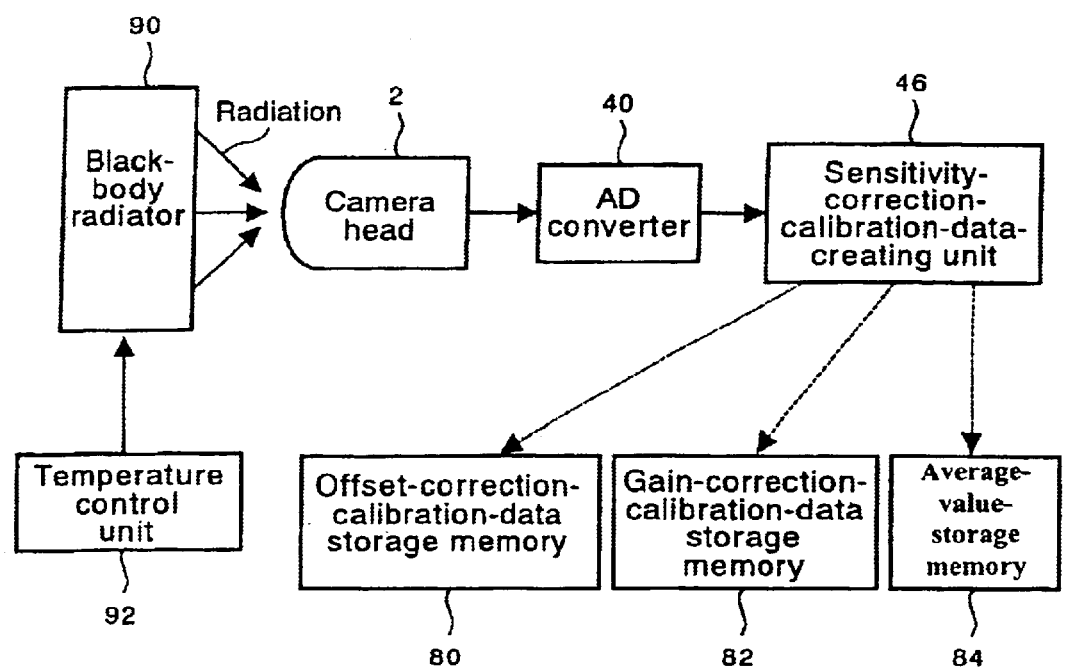
FIG. 5 is an explanatory diagram used for describing a method of creating sensitivity-correction-calibration data.
Figure 6:
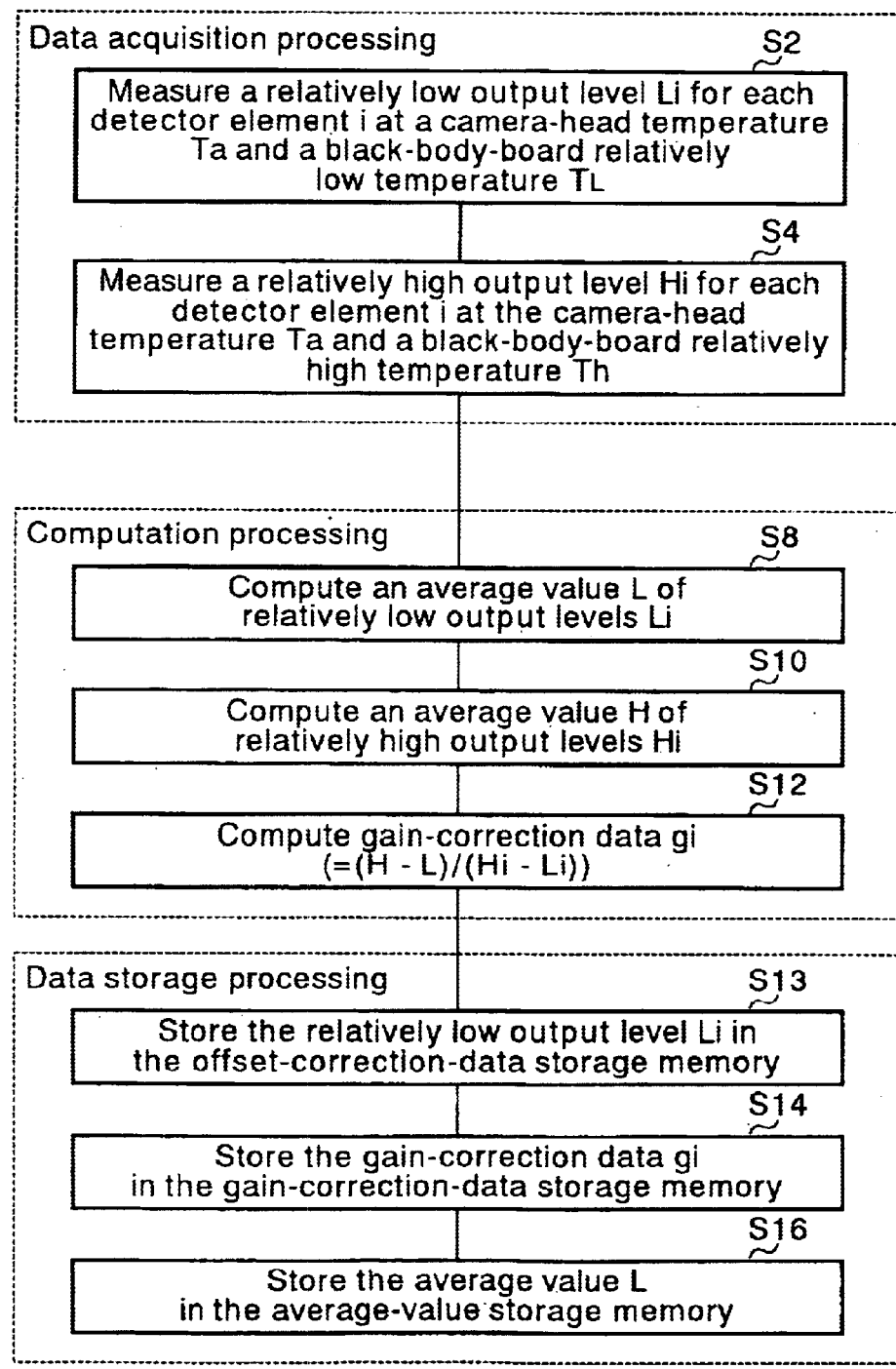
FIG. 6 is a flowchart representing a process of creating sensitivity-correction-calibration data.

FIG. 4 is a diagram showing the configuration of the sensitivity-correction-calibration-data-creating unit 46 employed in the shading-correction unit shown in FIG. 3. As shown in FIG. 4, the sensitivity-correction-calibration-data-creating unit 46 is comprised of a low-temperature-uniform-data acquisition unit 70, a high-temperature-uniform-data acquisition unit 72, an offset-correction-calibration-data-creating unit 74, a gain-correction-calibration-data-creating unit 76 and an average-value-computing unit 78. FIG. 5 is an explanatory diagram used for describing a method of creating sensitivity-correction-calibration data. FIG. 6 is a flowchart representing a process of creating sensitivity-correction-calibration data.

(a) Data Acquisition Processing

In order to create sensitivity-correction calibration data, a black-body-radiator 90 is placed in front of the camera head 2 as shown in FIG. 5. The black-body-radiator 90 is a typical radiating body used for obtaining a uniform scene. For example, the black-body-radiator 90 is formed by applying a black coating material to a metallic plate which is made of typically aluminum and has a rough surface. A temperature control unit 92 controls the temperature of the black-body-radiator 90.

At the first step S2 of the flowchart shown in FIG. 6, a picture of the black-body-radiator 90 is taken at $T_a$ of typically 10 degrees Celsius and $T_L$ of typically 10 degrees Celsius where notation $T_a$ denotes a predetermined temperature of the camera head 2, and notation $T_L$ denotes a relatively low temperature of the black-body-radiator 90 respectively. The low-temperature-uniform-data acquisition unit 70 acquires the output level Li of each detector element i under above low temperature condition, and stores the level Li in a memory.

At the next step S4, the high-temperature-uniform-data acquisition unit 72 takes a picture of the black-body-radiator 90 at the temperature $T_a$ of the camera head 2 and a high temperature $T_H$ of typically 30 degrees Celsius where notation $T_H$ denotes a relatively high temperature of the black-body-radiator 90. The high-temperature-uniform-data acquisition unit 72 acquires the output level Hi of each detector element i under above high temperature condition, and stores the level Hi in the memory.

(b) Calculation Processing

At the next step S8, the gain-correction-calibration-data-creating unit 76 computes an average value L of output levels Li for all detector elements i. At the next step S10, the gain-correction-calibration-data-creating unit 76 computes an average value H of output levels Hi for all detector elements i. At the next step S12, the gain-correction-calibration-data-creating unit 76 computes gain-correction calibration data gi expressed by Eq. (1) for each detector element i. The output levels Hi and Li as well as the average values L and H each contain shading components caused by the housing. Since the temperature $T_a$ of the camera head 2 is not changed, however, the housing radiation power at the low temperature $T_L$ of the black-body-radiator 90 is the same as the housing radiation power at the high temperature $T_H$ of the black-body-radiator 90. Thus, shading components caused by the housing, which are contained in the relatively high output level Hi, are the same as those contained in the relatively low output level Li. By the same token, shading components caused by the housing, which are contained in the average value H, are the same as those contained in the average value L. As a result, the gain-correction calibration data gi does not contain shading components caused by the housing.

(c) Data Writing Processing

At the next step S13, the offset-correction-calibration-data-creating unit 74 stores the relatively low output level Li for each of the detector elements i in an offset-correction-calibration-data storage memory 80. At the next step S14, the gain-correction-calibration-data-creating unit 76 stores the gain-correction calibration data gi for each of the detector elements i in a gain-correction-calibration-data storage memory 82. At the next step S16, the average-value-computing unit 78 stores the average value L in an average-value storage memory 84.

Figure 8:
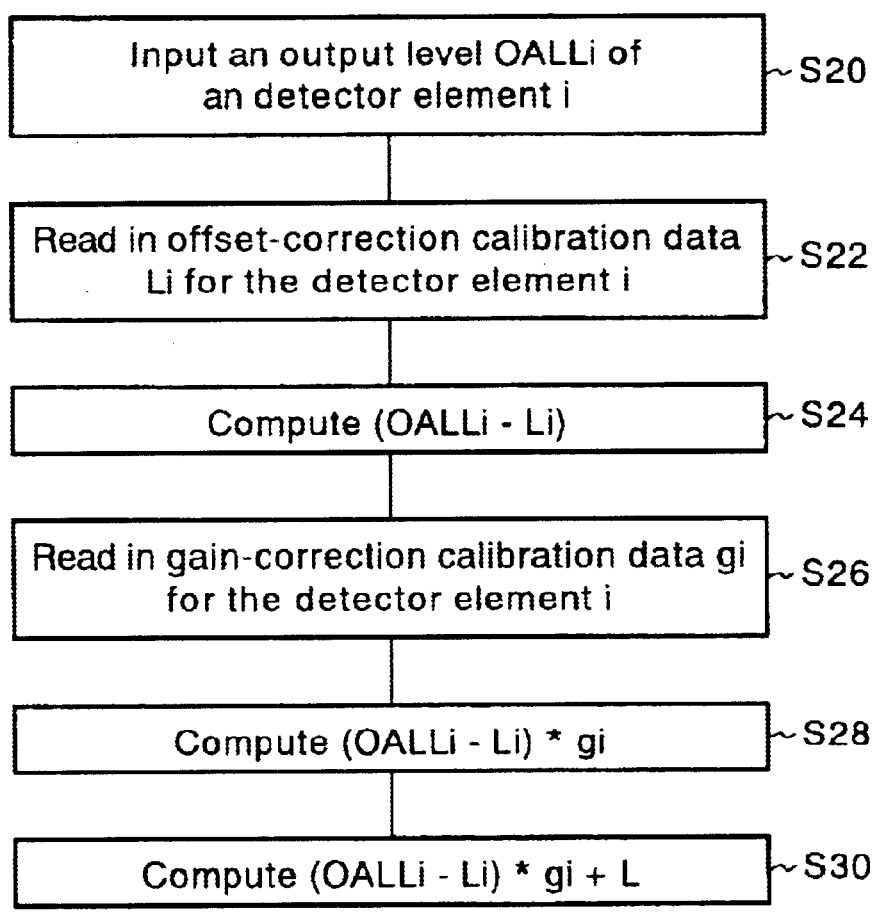
FIG. 8 is a flowchart representing sensitivity correction.

FIG. 7 is a diagram showing the configuration of the sensitivity-correction-processing unit 56 employed in the shading-correction unit 42 shown in FIG. 3. As shown in the figure, the sensitivity-correction-processing unit 56 includes the offset-correction-calibration-data storage memory 80, the gain-correction-calibration-data storage memory 82, the average-value storage memory 84, an adder 90, a multiplier 92 and an adder 94. FIG. 8 is a flowchart representing sensitivity correction. As shown in the figure, at a step S20 the adder 90 inputs digital picture data OALLi of a detector element serially outputted by the AD converter 40 in synchronization with a clock signal shown in none of the figures. At the next step S22, the adder 90 reads offset-correction calibration data Li of the detector element i from the offset-correction-calibration-data storage memory 80. At the next step S24, the adder 90 subtracts the offset-correction calibration data Li from the offset-correction calibration data Li to result in a difference (OALLI−Li). At the next step S26, the multiplier 92 reads gain-correction calibration data gi of the detector element i from the gain-correction-calibration-data storage memory 82. At the next step S28, the multiplier 92 multiplies the gain-correction calibration data gi by the difference (OALLi−Li) to give a product (OALLi−Li)×gi. At the next step S30, the adder 94 reads the average value L from the average-value storage memory 84 for use in computation of the value of an expression ((OALLi−Li)× gi+L) representing picture data Xi, that is, Xi=((OALLi−Li)×gi+L). It should be noted that the average value L is computed as an average of pieces of offset-correction calibration data Li of all detector elements i.

The following description explains the fact that the picture data Xi has indeed completed sensitivity correction. In the description of the present invention, sensitivity correction is defined as correction of optical shading, which is caused by difference of physical positions of detector elements and scene component is not uniform in the case of a uniform scene and the detector elements with uniform characteristics, and correction of variations in characteristics of detector elements. In the case of a uniform scene, sensitivity correction is carried out to make scene components uniform over detector elements.

In the sensitivity correction, the following equations hold true: OALLI=SNi+HSi, Li=SNLi+HSLi and L=SNL+HSL where notations SN and HS denote the scene component and the housing component respectively. In this case, Xi=(SNi−SNLi)×gi+SNL+(HSi−HSLi)×gi+HSL. Since the gain-correction calibration data gi does not include shading components caused by the housing, ((SNi−SNLi)×gi+SNL) is about uniform for all detector elements in the case of a uniform scene, and regarded as a scene component completing sensitivity correction. On the other hand, ((HSi−HSLi)×gi+HSL) has a value different from the housing component HSi due to sensitivity correction. However, the greater the value of HSi, the greater the value of ((HSi−HSLi)×gi+HSL). Thus, the expression ((HSi−HSLi)×gi+HSL) represents a characteristic of HSi. As will be described later, this value is eliminated as a shading component caused by the housing. Thus, while the picture data Xi includes housing components, Xi is data completing sensitivity correction. In the following description, this picture data Xi is referred to as corrected-sensitivity picture data. In addition, even in the case of a non-uniform scene, the digital picture data is corrected in accordance with the picture-data level of the digital picture data OALLi by using the gain-correction calibration data gi which does not include shading components caused by the housing. Thus, the digital picture data is subjected to sensitivity correction according to the irradiance level of the scene.

Figure 9:
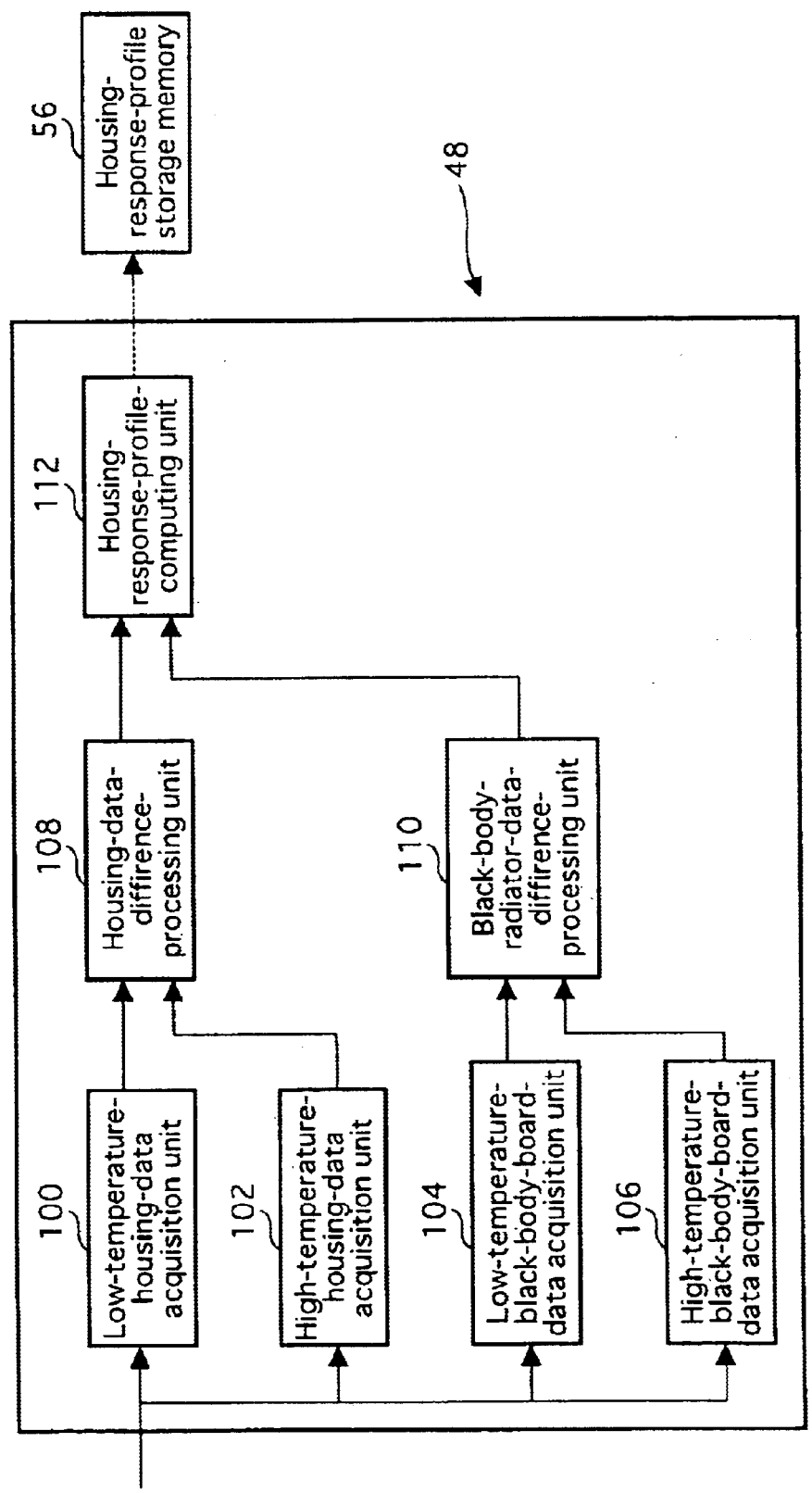
FIG. 9 is a diagram showing a typical configuration of a housing-response-profile-creating unit employed in the infrared imaging apparatus shown in FIG. 2.
Figure 10:
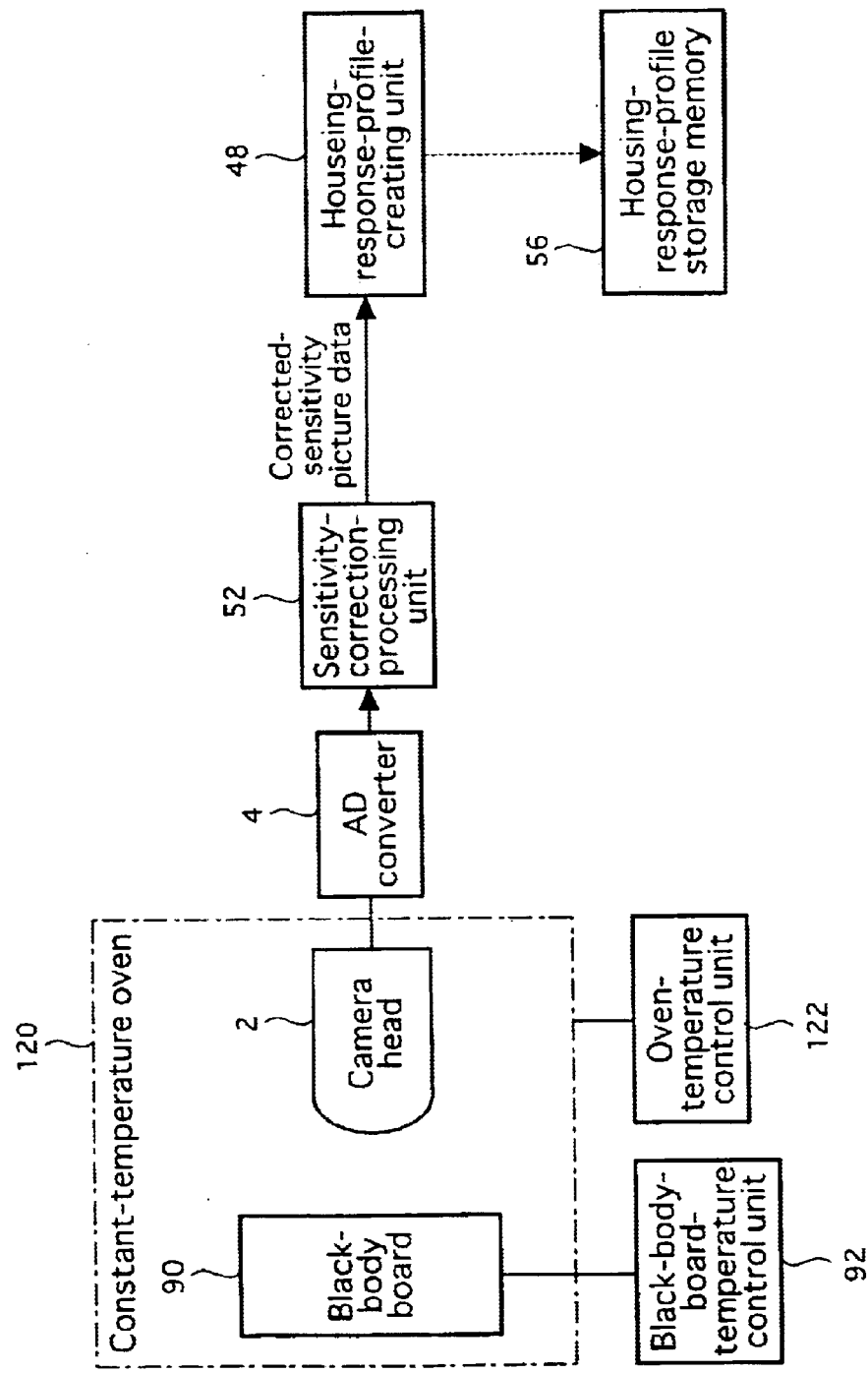
FIG. 10 is an explanatory diagram used for describing a method of creating a housing response profile.
Figure 11:
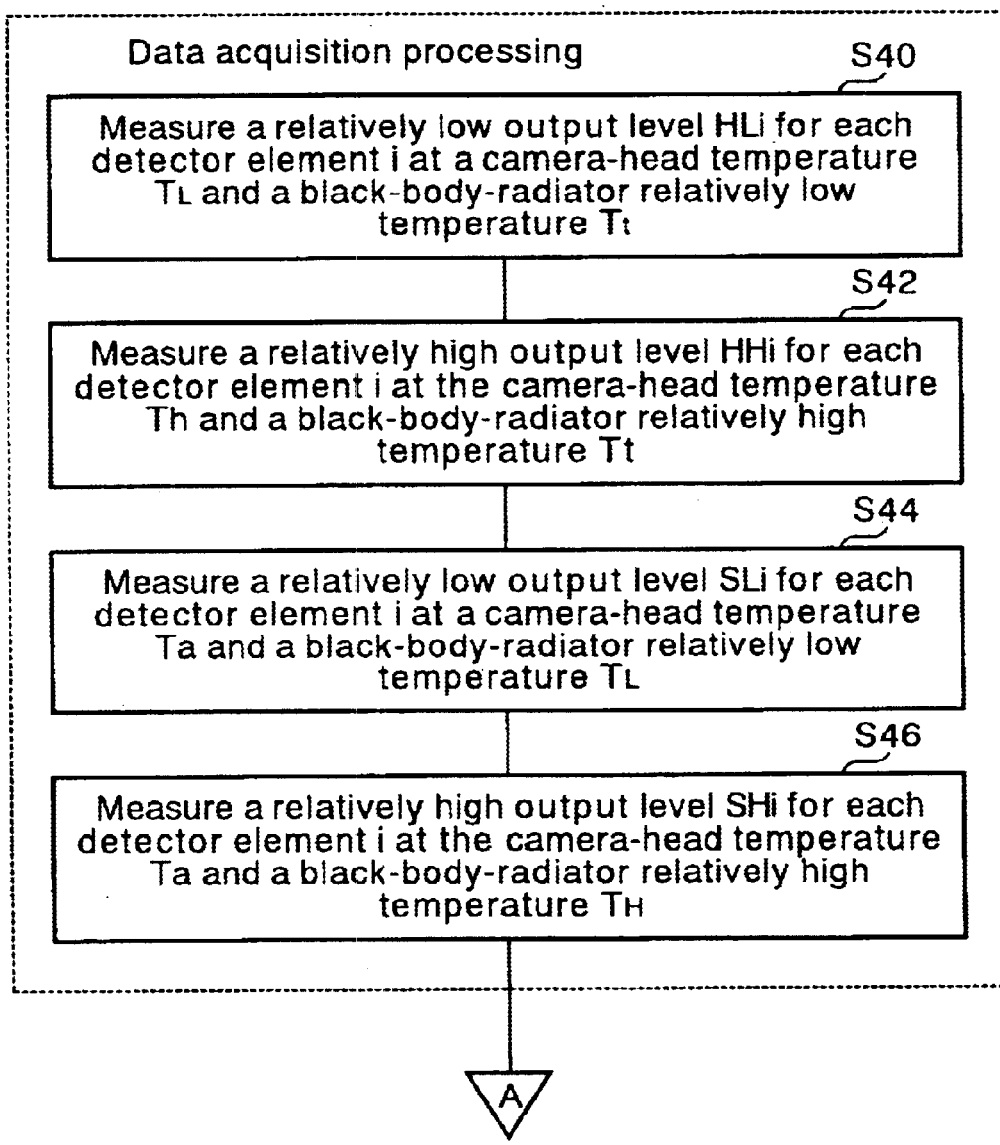
FIG. 11 is a flowchart representing the method of creating a housing response profile.
Figure 12:
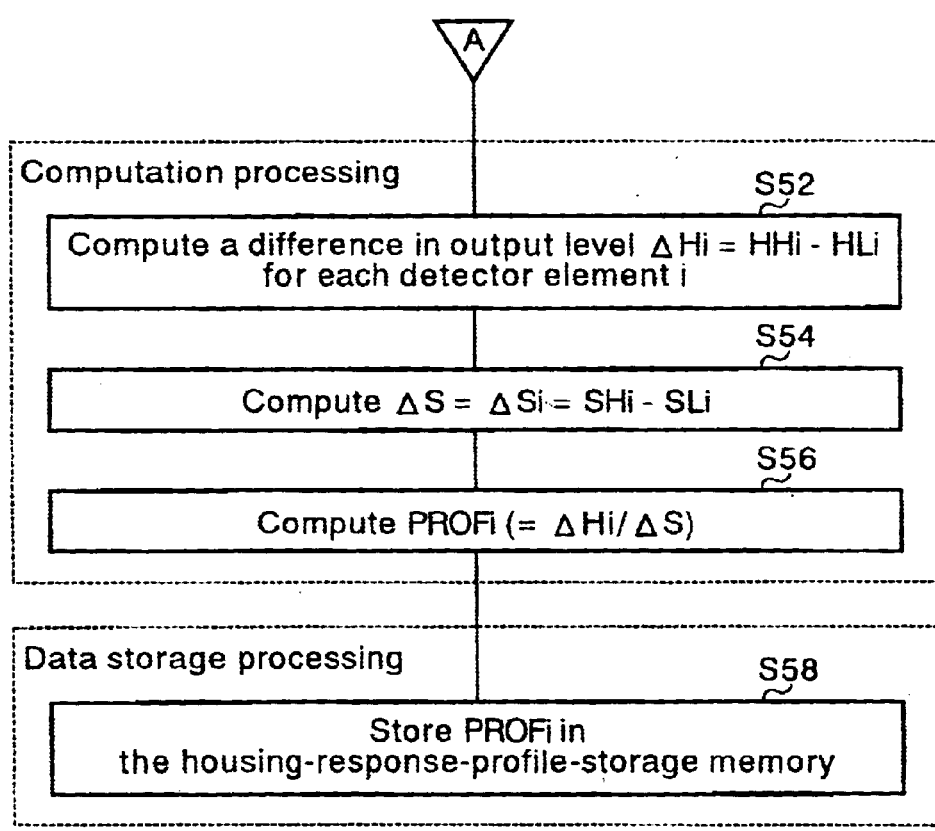
FIG. 12 is a continuation flowchart representing the method of creating a housing response profile.

FIG. 9 is a diagram showing a typical configuration of the housing-response-profile-creating unit 48 employed in the infrared imaging apparatus shown in FIG. 2. As shown in FIG. 9, the housing-response-profile-creating unit 48 is comprised of a low-temperature-housing-data acquisition unit 100, a high-temperature-housing-data acquisition unit 102, a low-temperature-black-body-radiator-data acquisition unit 104, a high-temperature-black-body-radiator-data acquisition unit 106, a housing-data-difference-processing unit 108, a black-body-radiator-data-difference-processing unit 110 and a housing-response-profile-computing unit 112. FIG. 10 is an explanatory diagram used for describing a method of creating a housing response profile. FIGS. 11 and 12 show a flowchart representing the method of creating a housing response profile.

(a) Data Acquisition Processing

In order to create a housing response profile, the camera head 2 is accommodated in a temperature stabilized oven 120 as shown in FIG. 10. The temperature of the temperature stabilized oven 120 is controlled by an oven-temperature control unit 122. The black-body-radiator 90 is placed in front of the camera head 2. The temperature of the black-body-radiator 90 is controlled by a black-body-radiator-temperature control unit 92.

At the first step S40 of the flowchart shown in FIG. 11, a picture of the black-body-radiator 90 is taken at $T_t$ of typically 10 degrees Celsius and $T_L$ of typically 10 degrees Celsius where notation $T_L$ denote a relatively low temperature of the camera head 2 and notation Tt denotes a predetermined temperature of the black-body-radiator 90. The low-temperature-shading-data acquisition unit 100 acquires the relatively high output level HLi of each detector element i under above condition, and stores the level HLi in a memory.

At the next step S42, a picture of the black-body-radiator 90 is taken at the temperature Tt and a temperature $T_H$ of typically 30 degrees Celsius where notation Th denotes a relatively high temperature of the camera head 2. The high-temperature-shading-data acquisition unit 102 acquires the relatively high output level HHi of each detector element i under above condition, and stores the level HHi in the memory.

At the next step S44, a picture of the black-body-radiator 90 is taken at the temperatures $T_a$ and $T_L$, and the output level SLi of each detector element i is acquired where notation $T_a$ denotes a predetermined temperature of the camera head 2 and notation $T_L$ denotes a relatively low temperature of the black-body-radiator 90. At the next step S46, a picture of the black-body-radiator 90 is taken at the temperature $T_a$ of the camera head 2 and a temperature $T_H$, and the output level SHi of each detector element i is acquired where notation $T_H$ denotes a relatively high temperature of the black-body-radiator 90. The outputs levels HLi, HHi, SLi and SHi are each corrected-sensitivity picture data output by the sensitivity-correction-processing unit 52.

(b) Calculation Processing

At the next step S52, the housing-data-difference-processing unit 108 computes an output-level difference ΔHi (=HHi−HLi) of each detector element i. Since the output levels HLi and HHi are measured at the constant temperature $T_t$ of the black-body-radiator 90, scene components from the black-body-radiator 90, which are included in the relatively low output level HLi, are the same as those included in the relatively high output level HHi. Thus, the output-level difference ΔHi comprises only housing-shading components caused by a temperature change $\Delta T(=T_H-T_L)$ of the camera head 2.

At the next step S54, the black-body-radiator-data-difference-processing unit 110 computes an output-level difference $\Delta Si(=SHi-SLi)$ of each detector element i. The output levels SLi and SHi, which are measured at the constant temperature $T_a$ of the camera head 2, have been subjected to sensitivity correction for scene components. Thus, the output-level difference $\Delta Si$ is fixed independently of the detector elements i.

Let notation $\Delta HP$ denote a change in radiance accompanying a change in housing (camera-head) temperature ($T_H-T_L$) where the radiance is defined as an infrared radiation power expressed in terms of W/cm$^2$.sr. In this case, HRi(= $\Delta Hi/\Delta HP$) expressed in terms of LSB/(W/cm$^2$.sr) is a change in output level per unit housing radiation power where the output level is a level output by each detector element i.

By the same token, let notation $\Delta SP$ denote a change in radiance accompanying a change in black-body-radiator temperature ($T_H-T_L$). In this case, SRi(=$\Delta Si$=(SHi-SLi)/$\Delta SP=\Delta s/\Delta SP$) expressed in terms of LSB/(W/cm$^2$.sr) is a change in output level per black-body-radiator unit radiation power where the output level is a level output by each detector element i. Since the change in housing temperature ($T_H-T_L$) is made equal to the change in black-body-radiator temperature ($T_H-T_L$), $\Delta SP=\Delta HP$. It should be noted that, in the above description, the housing and the black-body-radiator 90 are assumed to have black-body characteristics of the same type. At the next step S56, the housing-response-profile-computing unit 112 computes a housing response profile PROFi (=HRi/SR=($\Delta Hi/\Delta HP$)/($\Delta S/\Delta SP$)=$\Delta Hi/\Delta S$) for each detector element i.

(c) Data Writing Processing

At the next step S58, the housing-response-profile-computing unit 112 stores the housing response profile PROFi computed for each detector element i in the housing-response-profile storage memory 56.

The housing response profile PROFi is a ratio of a housing component to a scene component where the scene component is an output of a detector element i per black-body-radiator unit radiation power and the housing component is an output of the detector element i per unit housing radiation power. It is nice to have a housing response profile PROFi equal to a fixed number of times $\Delta Hi$. By dividing $\Delta Hi$ by $\Delta S$, however, the physical dimensions can be made dimensionless, and the computation of a housing component included in corrected-sensitivity picture data can thus be made simple. In addition, it becomes possible to set a standard for estimating an upper limit of the ratio of a housing component included in the corrected-sensitivity picture data to a scene component.

Figure 13:
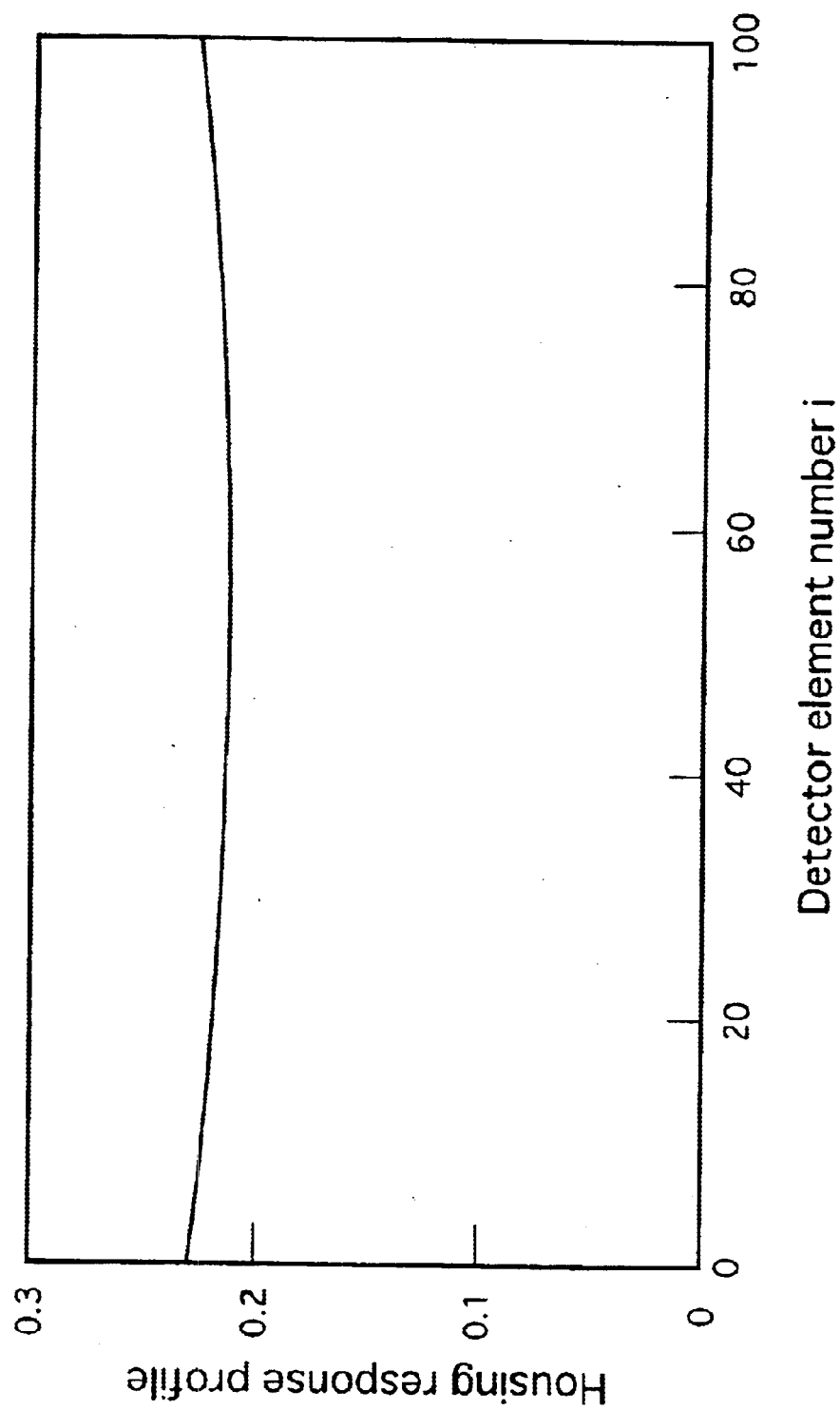
FIG. 13 is a diagram showing a typical housing response profile.

FIG. 13 is a diagram showing a typical housing response profile. In the diagram, the horizontal axis represents the number i of the detector elements and the vertical axis represents the housing profile response. To put in detail, FIG. 13 is shows a housing response profile PROFi of 100 detector elements on the center line of the infrared sensor 16 comprising detector elements laid out to form a 100×100 matrix. The housing response profile is increasing, starting from a detector element 50 in the middle of the center line toward both the ends of the center line because detector elements at the ends each have a larger housing perspective angle.

The housing-component-intensity-processing unit 58 computes a constant Ih for calculating a housing component from the housing response profile PROFi. For a detector element i, let notation MDOALLi denote the level of the corrected-sensitivity picture data, notation MDSNi denote the level of picture data for a scene component in the corrected-sensitivity picture data and notation MDHSi denote the level of picture data for a housing component. In this case, Eq. (2) expressing a relation among MDOALLi, MDSNi and MDHSi below holds true.

$$MDOALLi=MDSNi+MDHSi \quad (2)$$

Since the picture-data level MDHSi is a product of the housing response profile PROFi stored in the housing-response-profile storage memory 56 and the constant Ih, Eq. (2) can be re-expressed by Eq. (3) as follows:

$$MDOALLi=MDSNi+Ih\times PROFi \quad (3)$$

In the case of a scene with uniform radiance, the scene incident component MDSNi has a fixed value MDSN0 independent of the detector element i. Thus, simultaneous equations (4) and (5) can be derived from Eq. (3) for detector elements 1 and 2 respectively as follows:

$$MDOALL1=MDSN0+Ih\times PROF1 \quad (4)$$

$$MDOALL2=MDSN0+Ih\times PROF2 \quad (5)$$

As a solution to the simultaneous equations (4) and (5), the value of Ih can be obtained as expressed by Eq. (6) as follows:

$$Ih=(MDOALL1-MDOALL2)/(PROF1-PROF2) \quad (6)$$

Noises are superposed on actual picture data. Thus, even in the case of a uniform scene, it is generally difficult to find a strict solution to such simultaneous equations. For this reason, a technique of finding an approximate solution is required. In addition, the technique needs to be applicable to not only a uniform scene but also a locally uniform scene. Therefore, in this embodiment, simultaneous equations are established for detector elements in a picture data area set in advance. Then, by using the least-square method, an approximate solution to the simultaneous equations can be found.

Figure 14:
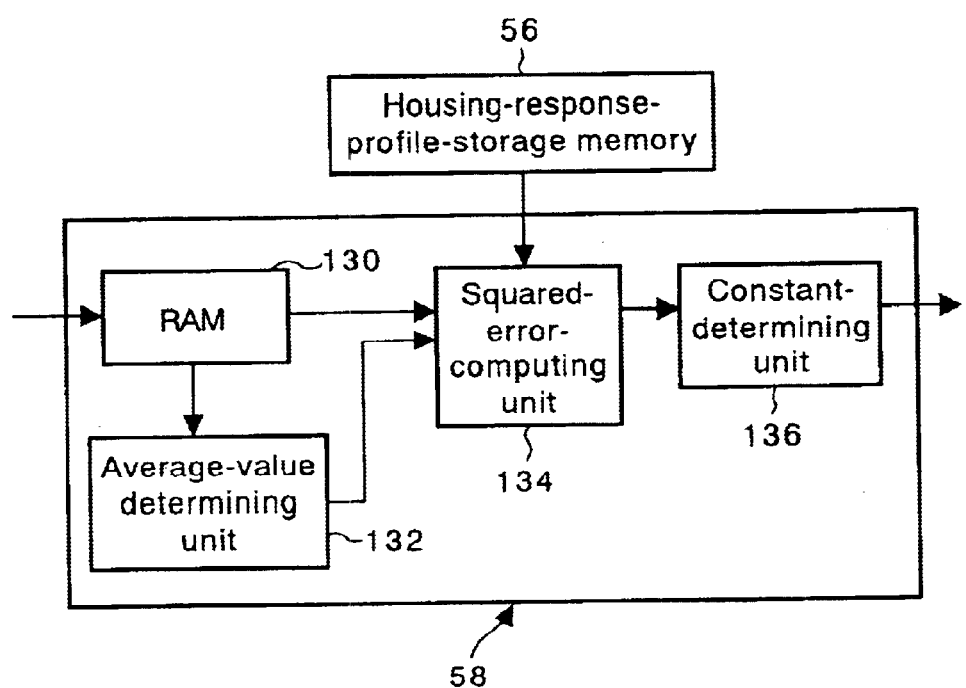
FIG. 14 is a diagram showing the configuration of a housing-component-intensity-processing unit employed in the shading-correction unit shown in FIG. 3.

FIG. 14 is a diagram showing the configuration of the housing-component-intensity-processing unit 58 employed in the shading-correction unit 42 shown in FIG. 3. As shown in FIG. 14, the housing-component-intensity-processing unit 58 comprises a RAM 130, an average-value-computing unit 132, a squared-error-computing unit 134 and a constant-determining unit 136. The RAM 130 is a memory for storing picture data. It should be noted that, while the picture data stored in the RAM 130 can be all picture data, data which is included in a picture data area set in advance and is used by the squared-error-computing unit 134 can serve as sufficient stored picture data. The average-value-computing unit 132 computes an average value MOUT of data included in the picture data area set in advance by the squared-error-computing unit 134. The squared-error-computing unit 134 has the following functions:

1: Set a tentative constant Ihj and a tentatively set scene level ISk.
2: Compute a squared error SE (j, k) which is a sum of an expression $\{ISk-(MDOALLi-Ihj\times PROFi)\}^2$ computed with respect to i in the picture data area set in advance. The picture data area set in advance can be the output picture data area of all detector elements of the infrared sensor 16. At any rate, the precision of the constants is required. In addition, it is necessary to minimize the picture data area set in advance so that the computation can be carried out at a high speed. Since housing components are distributed into concentric circles with their centers all coinciding with a detector element in the middle, data of detector elements on a line (a column or a row) is taken. In this case, it is desired to select a line with an extremely uniform scene distribution. In the case of an application with the sky serving as the background, since the scene distribution on a horizontal line is more uniform than that on a vertical line, data of detector elements on a horizontal line is taken. An example of the application with the sky serving as the background is an air-to-air missile seeker.

3: Carry out the computation of function 2 for every possible combination of each tentative constant Ihj and the tentatively set scene level ISk.

Figure 15:
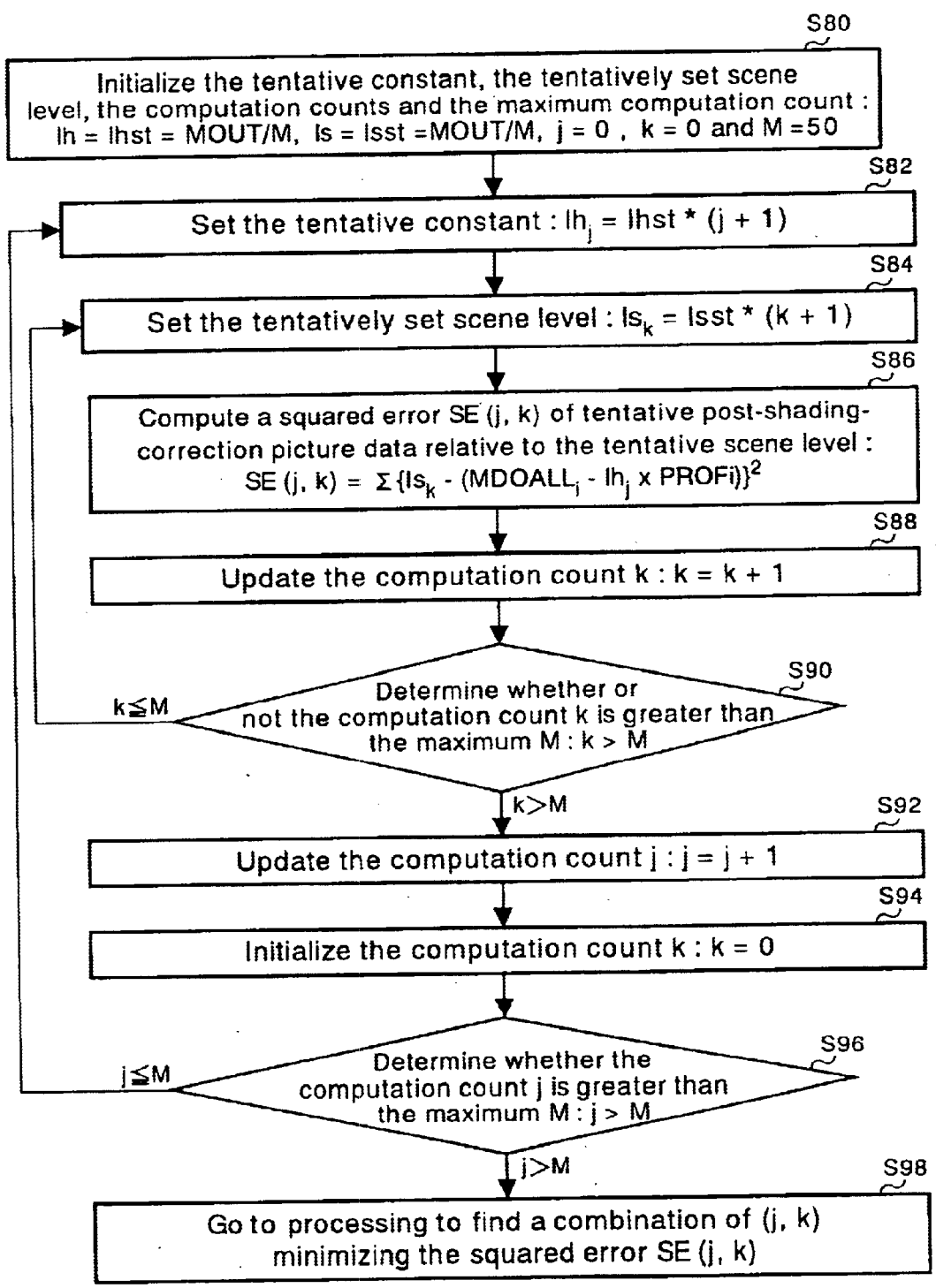
FIG. 15 is a flowchart representing computation of a squared error.

FIG. 15 is a flowchart representing computation of a squared error. Details of the squared-error computation are explained as follows. As shown in the figure, the flowchart begins with a step S80 at which the tentative constant Ih is set at Ihst (=MOUT/M), the tentatively set scene level Is is set at Isst (=MOUT/M), where M=50, whereas the computation counts j and k are each initialized at 0. Notation M denotes a maximum computation count having a suitable value such as 50. At the next step S82, the tentative constant Ihj is set at Ihst×(j+1). Then, at the next step S84, the tentatively set scene level ISk is set at Isst×(k+1). Subsequently, at the next step S86, a squared error SE (j, k) of picture data after tentative shading correction relative to the tentative scene level is computed by using the following equation:

$$SE(j, k) = \Sigma\{ISk - (MDOALLi - Ihj \times PROFi)\}^2$$

where notation $\Sigma$ denotes summation for all detector elements i along a horizontal-direction line at the center.

Then, at the next step S88, the computation count k is incremented by 1 to give an updated value of (k+1) as denoted by notation (k=k+1) in the flowchart shown in FIG. 15. The flow of the squared-error computation then goes on to a step S90 to form a judgment as to whether or not the count value k is greater than the maximum count value M (k>M). If the count value k is not greater than the maximum count value M (k≦M), the flow of the squared-error computation goes back to the step S84. If the count value k is greater than the maximum count value M (k>M), on the other hand, the flow of the squared-error computation goes on to a step S92. At the step S92, the computation count j is incremented by 1 to give an updated value of (j+1) as denoted by notation (j=j+1) in the flowchart shown in FIG. 15. Then, at the next step S94, the computation count k is set at an initial value of 0. The flow of the squared-error computation then goes on to a step S96 to form a judgment as to whether not the count value j is greater than the maximum count value M (j>M). If the count value j is not greater than the maximum count value M (j≦M), the flow of the squared-error computation goes back to the step S82. If the count value j is greater than the maximum count value M (j>M), on the other hand, the flow of the squared-error computation goes on to a step S98. At the step S98, processing represented by a flowchart to be described later is carried out to find a combination of the computation count j and the computation count k that minimizes the squared error SE (j, k). The constant-determining unit 136 computes the constant value Ih (=Ihst×(J+1)) for the combination of J and K where notations J and K are respectively the computation counts j and k that minimize the squared error SE (j, k) computed by the squared-error-computing unit 134.

Figure 16:
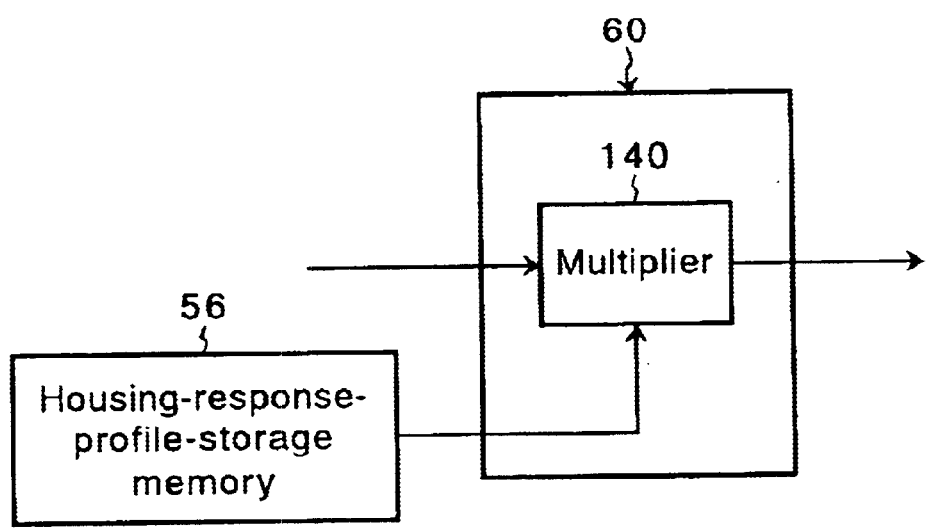
FIG. 16 is a diagram showing the configuration of a housing-shading-correction-quantity-computing unit employed in the shading-correction unit shown in FIG. 3.

FIG. 16 is a diagram showing the configuration of the housing-shading-correction-quantity-computing unit 60 employed in the shading-correction unit 42 shown in FIG. 3. As shown in the figure, the housing-shading-correction-quantity-computing unit 60 has a multiplier 140. The multiplier 140 computes a product of the housing response profile PROFi and the constant Ih for all detector elements i.

Figure 17:
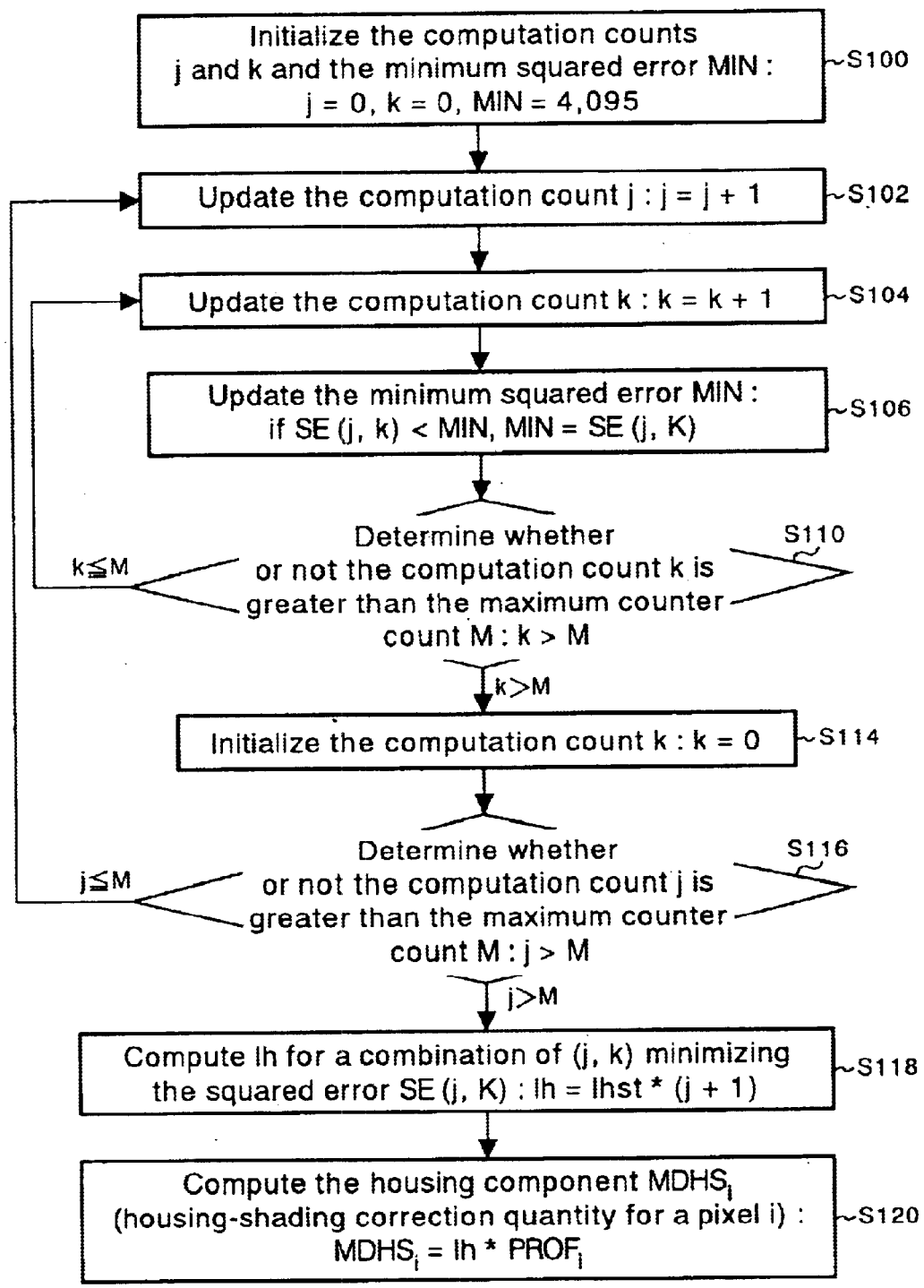
FIG. 17 is a flowchart representing computation of a combination of j and k that gives a minimum SE (j, k) and computation of a housing-shading correction quantity.

FIG. 17 is a flowchart representing computation of a combination of the computation counts j and k that gives a minimum squared error SE (j, k) and computation of a housing-shading correction quantity. As shown in the figure, the flowchart begins with a step S100 at which the computation counts j and k are each initialized at 0 (j=0 and k=0) whereas a minimum value MIN of the squared error SE (j, k) is initialized at 4,095 (MIN=4,095). At the next step S102, the computation count j is incremented by 1 to give an updated value of (j+1) as denoted by notation (j=j+1) in the flowchart shown in FIG. 17. Then, at the next step S104, the computation count k is incremented by 1 to give an updated value of (k+1) as denoted by notation (k=k+1) in the flowchart. Subsequently, at the next step S106, the squared error SE (j, k) is substituted for the minimum value MIN if SE (j, k)<MIN. If SE (j, k)≧MIN, on the other hand, nothing is done. The flow of the processing then goes on to a step S110 to form a judgment as to whether or not the computation count k is greater than the maximum value M (k>M). If the computation count k is not greater than the maximum value M (k≦M), the flow of the processing goes back to the step S104. If the computation count k is greater than the maximum value M (k>M), on the other hand, the flow of the processing goes on to the step S114. At the step S114, the computation count k is reset at the initial value of 0 (k=0). The flow of the processing then goes on to a step S116 to form a judgment as to whether or not the computation count j is greater than the maximum computation count M (j>M). It should be noted that the maximum computation count M is the same as that used in the flowchart shown in FIG. 15. If the computation count j is not greater than the maximum value M (j≦M), the flow of the processing goes back to the step S102. If the computation count k is greater than the maximum value M (j>M), on the other hand, the flow of the processing goes on to the step S118. At the step S118, the constant-determining unit 136 computes the constant value Ih (=Ihst×(J+1)) for the combination of J and K where notations J and K are respectively the computation counts j and k that minimize the squared error SE (j, k) computed by the squared-error-computing unit 134. At the next step S120, the housing component MDHSi (=Ih×PROFi) is computed for each detector element i.

Figure 18:
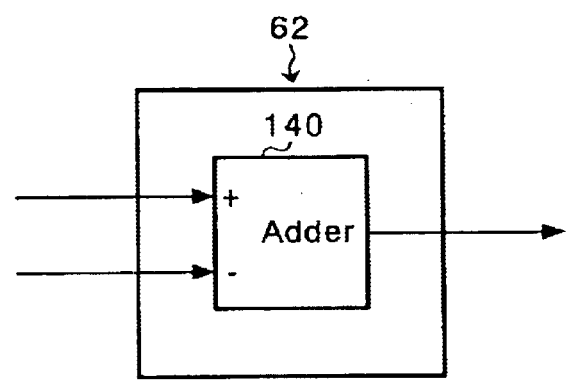
FIG. 18 is a diagram showing the configuration of a housing-shading-correction-processing unit employed in the shading-correction unit shown in FIG. 3.

FIG. 18 is a diagram showing the configuration of the housing-shading-correction-processing unit 62 employed in the shading-correction unit 42 shown in FIG. 3. As shown in FIG. 18, the housing-shading-correction-processing unit 62 has an adder 150. The adder 150 subtracts the housing component MDHSi from the corrected-sensitivity picture data level MDOALLi for each detector element i in order to correct shading components caused by the housing.

The operation of the infrared imaging apparatus shown in FIG. 2 is described as follows.

(1) Creation of Sensitivity-correction Calibration Data

Sensitivity-correction calibration data is created by the sensitivity-correction-calibration-data-creating unit 46 and stored in ROMS, namely, the offset-correction-calibration-data storage memory 80, the gain-correction-calibration-data storage memory 82 and the average-value storage memory 84, prior to the operation of the infrared imaging apparatus as follows.

First of all, as shown in FIG. 5, a picture of the black-body-radiator 90 is taken by using the camera head 2 at Ta of typically 10 degrees Celsius and $T_L$ of typically 10 degrees Celsius where notation $T_a$ denotes a predetermined temperature of the camera head 2 and notation $T_L$ denotes a relatively low temperature of the black-body-radiator 90. The AD converter 40 then converts an analog picture signal output by the camera head 2 into digital picture data. The sensitivity-correction-calibration-data-creating unit 46 inputs a relatively low level Li of the digital picture data for each detector element i under above condition and stores the level Li into the offset-correction-calibration-data storage memory 80. The sensitivity-correction-calibration-data-creating unit 46 then computes an average value L of the relatively low output levels Li for all detector elements i and stores the average value L into the average-value storage memory 84.

Then, a picture of the black-body-radiator 90 is taken by using the camera head 2 at the predetermined temperature $T_a$ and a temperature $T_H$ of typically 30 degrees Celsius where notation $T_H$ denotes a relatively high temperature of the black-body-radiator 90. The AD converter 40 then converts an analog picture signal output by the camera head 2 into digital picture data. The sensitivity-correction-calibration-data-creating unit 46 inputs a relatively high level Hi of the digital picture data for each detector element i, and computes gain-correction calibration data gi, storing the gain-correction calibration data gi in the gain-correction-calibration-data storage memory 82.

(2) Creation of a Housing Response Profile

A housing response profile is created by the housing-response-profile-creating unit 48 prior to the operation of the infrared imaging apparatus as described below and stored in a ROM, namely, the housing-response-profile storage memory 56. As shown in FIG. 10, a picture of the black-body-radiator 90 is imaged by using the camera head 2 at $T_t$ of typically 10 degrees Celsius and $T_L$ of typically 10 degrees Celsius where notation $T_L$ denotes a relatively low temperature of the camera head 2 and notation $T_t$ denotes a predetermined temperature of the black-body-radiator 90. The AD converter 40 then converts an analog picture signal output by the camera head 2 into digital picture data. Subsequently, the digital picture data is subjected to sensitivity correction in the sensitivity-correction-processing unit 52 to produce corrected-sensitivity picture data. The housing-response-profile-creating unit 48 then inputs a relatively low level HLi of the corrected-sensitivity picture data for each detector element i.

Then, a picture of the black-body-radiator 90 is imaged by using the camera head 2 at the predetermined temperature $T_t$ and a temperature $T_H$ of typically 30 degrees Celsius where notation $T_H$ denotes a relatively high temperature of the camera head 2. The AD converter 40 then converts an analog picture signal output by the camera head 2 into digital picture data. Subsequently, the digital picture data is subjected to sensitivity correction in the sensitivity-correction-processing unit 52 to produce corrected-sensitivity picture data. The housing-response-profile-creating unit 48 then inputs a relatively high level HHi of the corrected-sensitivity picture data for each detector element i.

On the other hand, a picture of the black-body-radiator 90 is imaged by using the camera head 2 at $T_a$ of typically 10 degrees Celsius and $T_L$ of typically 10 degrees Celsius where notation $T_a$ denotes a predetermined temperature of the camera head 2 and notation $T_L$ denotes a relatively low temperature of the black-body-radiator 90. The AD converter 40 then converts an analog picture signal output by the camera head 2 into digital picture data. Subsequently, the digital picture data is subjected to sensitivity correction in the sensitivity-correction-processing unit 52 to produce corrected-sensitivity picture data. The housing-response-profile-creating unit 48 then inputs a relatively low level SLi of the corrected-sensitivity picture data for each detector element i.

Then, a picture of the black-body-radiator 90 is imaged by using the camera head 2 at the predetermined temperature $T_a$ and a temperature $T_H$ of typically 30 degrees Celsius where notation $T_H$ denotes a relatively high temperature of the black-body-radiator 90. The AD converter 40 then converts an analog picture signal output by the camera head 2 into digital picture data. Subsequently, the digital picture data is subjected to sensitivity correction in the sensitivity-correction-processing unit 52 to produce corrected-sensitivity picture data. The housing-response-profile-creating unit 48 then inputs a relatively high level SHi of the corrected-sensitivity picture data for each detector element i.

Subsequently, the housing-response-profile-creating unit 48 computes an output-level differences ΔHi (=HHi−HLi) and ΔSi (=SHi−SLi) for each detector element i of the infrared sensor 16. As described above, the output-level difference ΔSi is an output-level difference ΔS uniform for all detector elements i. Then, the housing-response-profile-creating unit 48 computes a housing response profile PROFi (=ΔHi/ΔS) and stores the housing response profile PROFi in the housing-response-profile storage memory 56.

(3) Operation of Infrared Imaging Apparatus

In an infrared imaging apparatus applied to a variety of fields including a missile seeker, a lens images a scene on detector elements of the infrared sensor 16 and generates signals from detector elements i of the infrared sensor 16 to produce an analog signal according to the intensity of the scene. At that time, the analog signal includes housing radiation components radiated from the housing parts including the lens housing 10, the inner shell 18 and the outer shell 20. The AD converter 40 converts the analog signal into digital picture data, and supplies the digital picture data to the shading-correction unit 42.

Figure 19:
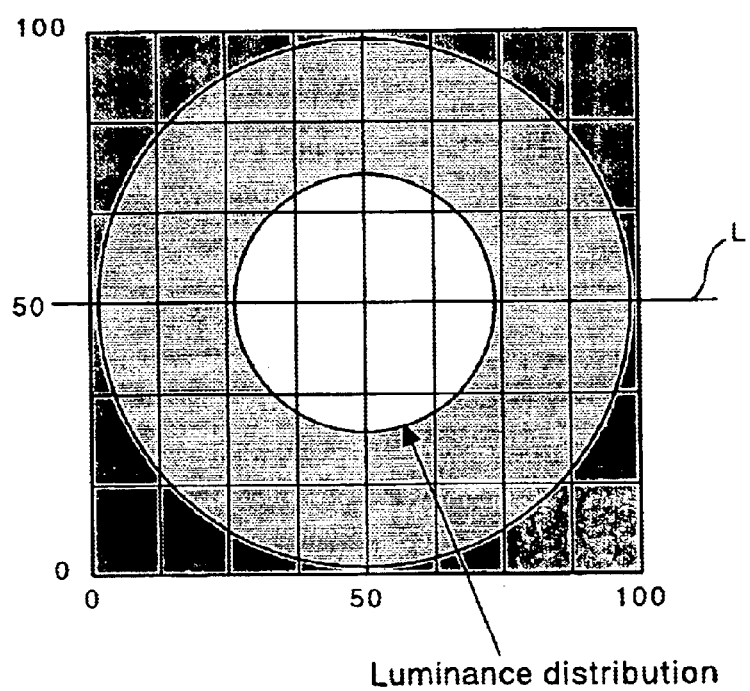
FIG. 19 is a diagram showing an irradiance distribution of an infrared detector for a uniform scene.

FIG. 19 is a diagram showing an irradiance distribution of an infrared detector comprising 100×100 detector elements for a uniform scene. As shown in FIG. 19, in the case of a uniform scene, the scene irradiance distribution at detector elements i becomes concentric circles centering at a detector element in the center of the infrared sensor 16. That is to say, output levels of detector elements at the same distance from the center detector element are all the same level.

Figure 20:
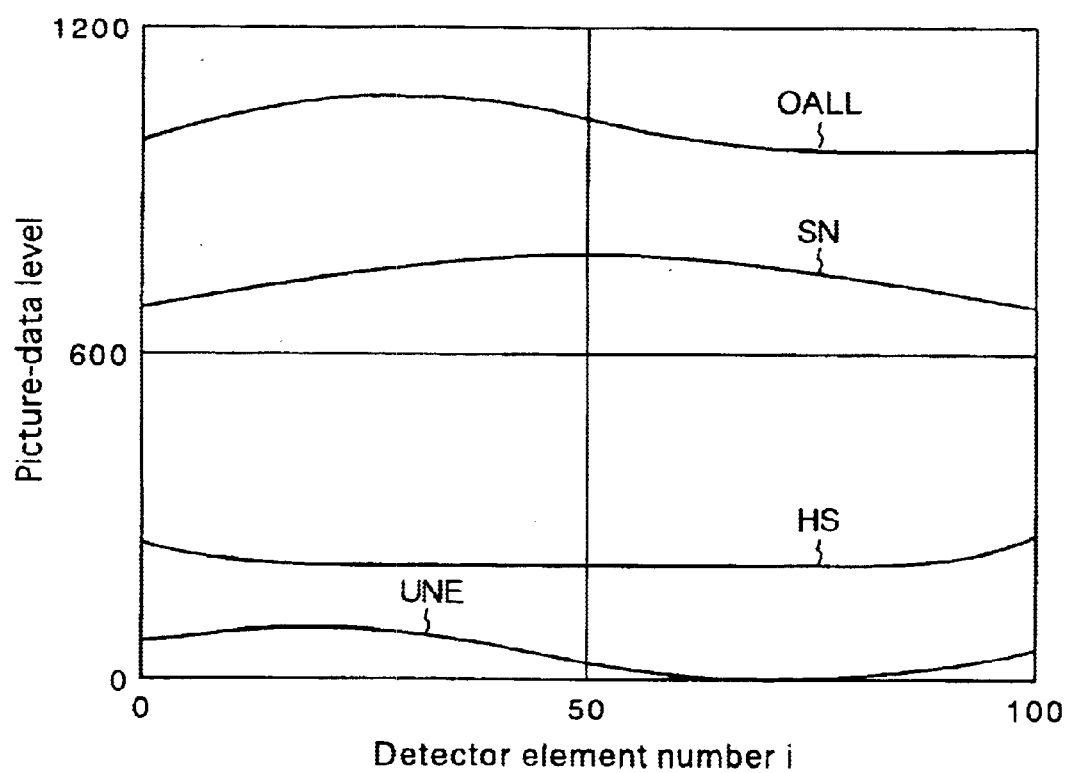
FIG. 20 is a diagram showing signal components included in the output of a detector element.

FIG. 20 is a diagram showing signal components included in the output of a detector element in the case of a uniform scene. The horizontal axis represents the number i of the detector element and the vertical axis represents the level of the picture data. FIG. 20 shows components included in digital picture data of 100 detector elements located on a center line L oriented in the horizontal direction in FIG. 19. A curve OALL represents digital picture data converted by the AD converter 40, a curve SN represents scene components caused only by shading of the optical system without characteristic variations of detector elements, a curve HS represents housing components and a curve UNE represents components caused by characteristic variations of detector elements. For a detector element i, a suffix i is appended as in OALLi, SNi, HSi and UNEi for denoting respectively digital picture data generated by the AD converter 40, scene components caused only by shading of the optical system without characteristic variations of detector elements, housing components and components caused by characteristic variations for the detector element i. In this case, OALLi=SNi+HSi+UNEi. As shown in FIG. 20, the curve SN indicates that scene components are not uniform even in the case of a uniform scene. Instead, the curve SN displays a peak at the center of the infrared sensor 16 and declines at detector elements separated away from the center. This phenomenon is caused by shading of the optical system.

(a) Sensitivity Correction Processing

The sensitivity-correction-processing unit 52 computes the value of an expression ((Digital picture data OALLi−Offset-correction calibration data Li)×Gain-correction calibration data gi+Average value L) to output corrected-sensitivity picture data for each detector element i. Thus, as described above, components in a scene, which are caused by shading of the optical system and the variation components UNE shown in FIG. 20, are corrected so that, in the case of a uniform scene, scene components become approximately uniform. The output of the sensitivity-correction-processing unit 52 is called corrected-sensitivity picture data.

Figure 21:
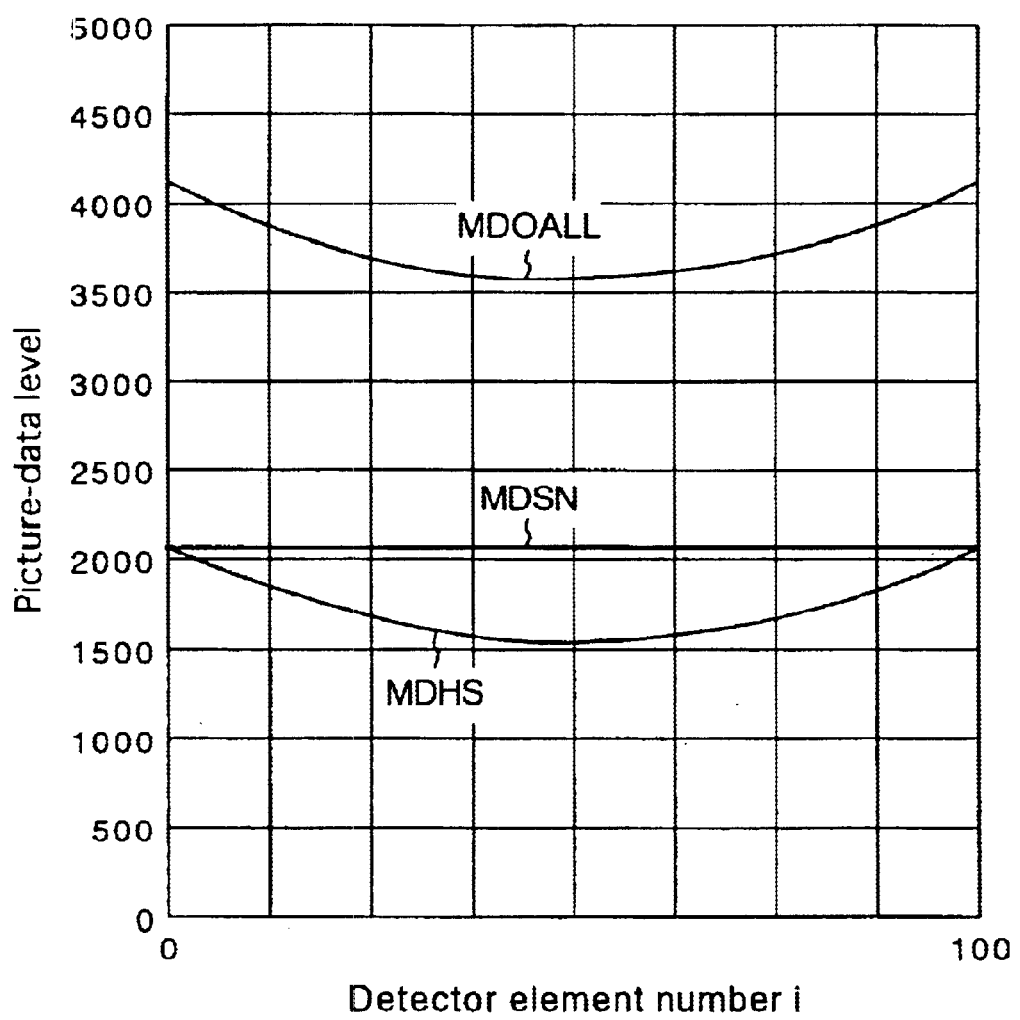
FIG. 21 is a diagram showing data of a corrected-sensitivity picture of a uniform scene.

FIG. 21 is a diagram showing corrected-sensitivity picture data for a uniform scene. The horizontal axis represents the number i of the detector element and the vertical axis represents the level of the picture data. A curve MDOALL represents corrected-sensitivity picture data and a curve MDSN represents corrected scene components in the corrected-sensitivity picture data. A curve MDHS represents corrected housing components. As shown in FIG. 21, in the case of a uniform scene, the corrected components MDSN are uniform independently of detector elements i. The curve MDOALL representing corrected-sensitivity picture data is a sum of the curve MDSN representing corrected scene components and the curve MDHS representing corrected housing components.

Figure 22:
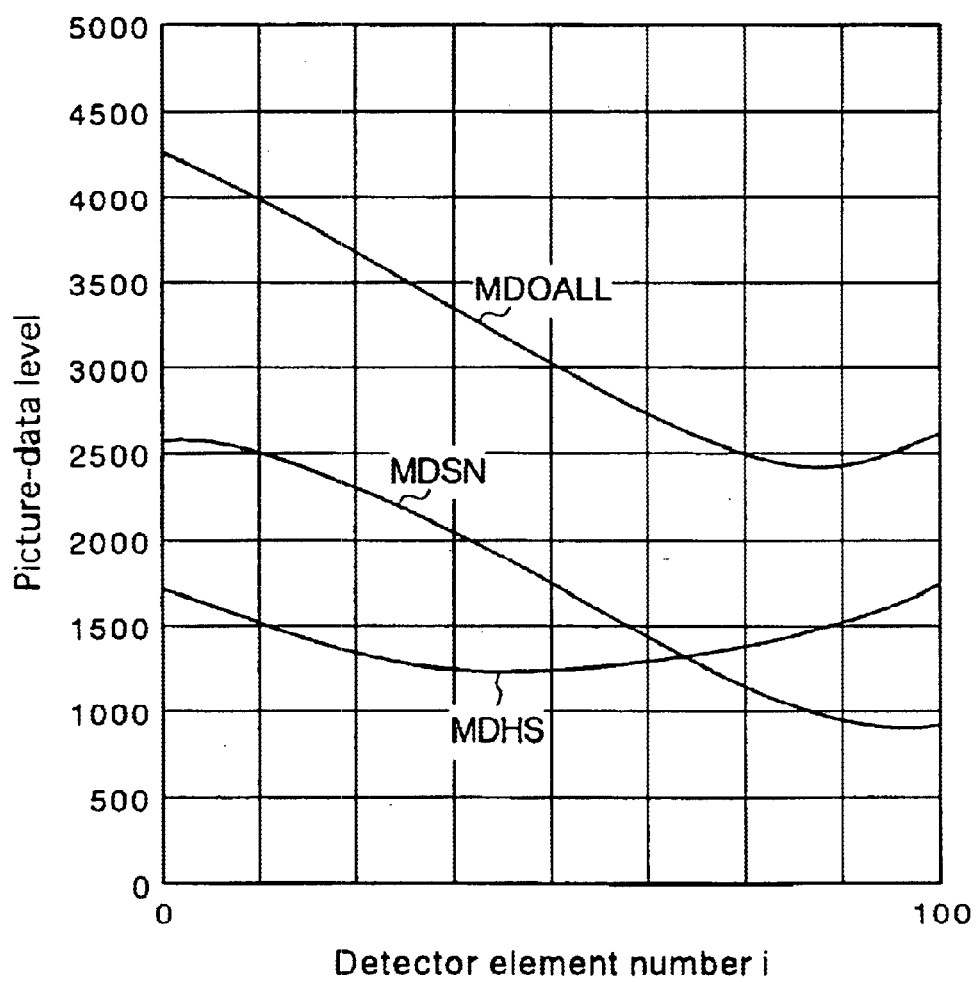
FIG. 22 is a diagram showing data of a corrected-sensitivity picture of a non-uniform scene.

FIG. 22 is a diagram showing data of a corrected-sensitivity picture of a non-uniform scene. The horizontal axis represents the number i of the detector element and the vertical axis represents the level of the picture data. As shown in FIG. 22, in the case of a non-uniform scene, the corrected components MDSN are not uniform independently of detector element i. As described above, however, in order to make picture data conform to the irradiance level of scene components, shading components caused by the optical system and components caused by characteristic variations of detector elements are corrected so that the curve MDOALL representing corrected-sensitivity picture data is equal to a sum of the curve MDSN representing corrected components in the corrected-sensitivity picture data and the curve MDHS representing housing components.

(b) Housing Shading Correction (b-1) Housing Component Intensity Processing

The housing-component-intensity-processing unit 58 computes an average value MOUT of pieces of corrected-sensitivity picture data MDOALLi for each frame where the pieces of corrected-sensitivity picture data MDOALLi are pieces of data of detector elements in a predetermined area of the infrared sensor 16. An example of the predetermined area is a center line of the infrared sensor 16. A frame is fixed period such as 16 ms of continuous screen data output from the infrared sensor 16. For the corrected-sensitivity picture data MDOALLi in a predetermined area of each frame, the following equation is assumed: MDOALLi=IS+MDHSi, where notation IS denotes scene components included in the corrected-sensitivity picture data MDOALLi in the case of a uniform scene, and notation MDHSi denotes housing components. By the way, the following equation holds true: MDHSi=Ih×PROFi. The squared error SE (j, k) is computed as a value of an equation $\{ISk-(MDOALLi-Ihj \times PROFi)\}^2$ where notation Ihj denotes the tentative constant and notation ISk denotes the initial tentatively set scene level in the predetermined area. It should be noted that the tentative constant ISk can have a value ranging from a minimum level to a maximum level of scene components that can be included in the corrected-sensitivity picture data MDOALLi. For example, the value ranges from MOUT/M to MOUT×(M+1)/M where notation M denotes the maximum computation count. The tentative constant Ihj can have a value ranging from a minimum level to a maximum level of house shading components that can be included in the corrected-sensitivity picture data MDOALLi. For example, the value ranges from MOUT/M to MOUT×(M+1)/M. Then, values of ISk and Ihj are computed for j and k that minimize the squared error SE (j, k) where notations j, k, j and k each denote a computation count. The value of Ihj becomes housing component intensity Ih where SE is minimized.

(b-2) Housing Shading Correction Quantity Computing

The housing-shading-correction-quantity-computing unit 60 multiplies the housing component intensity Ih by the housing response profile PROFi stored in the housing-response-profile storage memory 56 for all detector elements i of the infrared sensor 16 to output a housing shading correction quantity MDHSi (=PROFi×Ih).

(b-3) Housing Shading Correction

The housing-shading-correction-processing unit 62 subtracts the housing shading correction quantity MDHSi from the corrected-sensitivity picture data MDOALLi to compute housing-shading-corrected picture data OUTi (=MDOALLi−MDHSi). As shown in FIG. 21, in the case of a uniform scene, the housing-shading-corrected picture data OUTi consists of only a uniform-scene components MDSNi and is uniform independently of the detector element i. In addition, even in the case of a non-uniform scene including a partially uniform portion, the least-square method can be applied to correct shading components caused by the housing. Thus, the housing-shading-corrected picture data OUTi consists of only uniform-scene components MDSNi shown in FIG. 22 as a result of the housing-shading-correction. An example of the non-uniform scene including a partially uniform portion is a scene detected by detector elements at locations in close proximity to the right edge of corrected-sensitivity picture data shown in FIG. 22. In the case of a non-uniform scene including no partially uniform portion, on the other hand, the least-square method cannot be applied. Thus, the housing shading correction cannot be carried out. Since Ihk becomes approximately 0, however, the housing shading correction quantity also becomes approximately 0. As a result, there will be no picture-quality deterioration due to the fact that the picture data OUTi output by the housing-shading-correction-processing unit 62 is subjected to the housing shading correction unconditionally.

(c) Image Processing

The image-processing unit 44 inputs the picture data OUTi, which has completed correction of shading components caused by the optical system and correction of shading components caused by the housing, carries out image processing on the input picture data OUTi and displays the data OUTi for each detector element i. At that time, since the picture data OUTi has completed correction of shading components caused by the optical system and correction of shading components caused by the housing, the quality of the image processing can be improved. In the case of an infrared imaging apparatus mounted on a missile seeker, for example, it is possible to keep track of a target with a higher degree of reliability.

Second Embodiment

FIG. 23 is a diagram showing the configuration of an infrared imaging apparatus implemented by a second embodiment of the present invention. Configuration elements of the second embodiment, that are essentially identical with those employed in the first embodiment shown in FIG. 2, are denoted by the same reference numerals as the latter. A scanning unit 150 is a unit for driving the camera head 2 so as to move the view axis of the camera head 2 in a scanning movement. The view axis is an optical path of infrared rays passing through the center of the lens 8. In the case of a scene including no partially uniform portion, the view axis is put in a scanning movement and picture data obtained as a result of the scanning operation is smoothed to produce a partially uniform scene which can be subjected to housing shading correction.

Figure 24A:
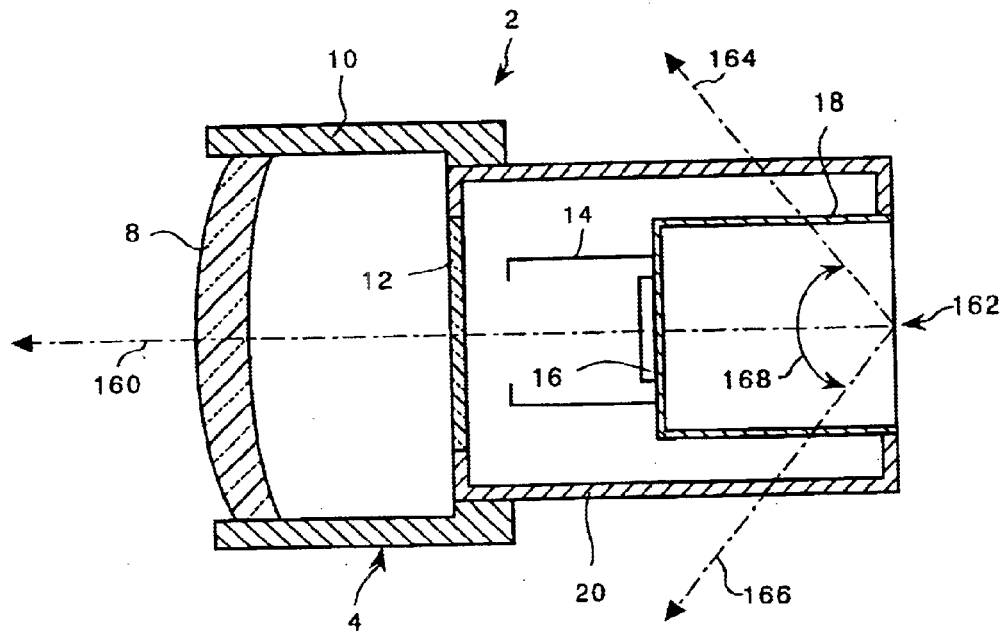
FIG. 24A is a diagram showing view axis scanning.
Figure 24B:
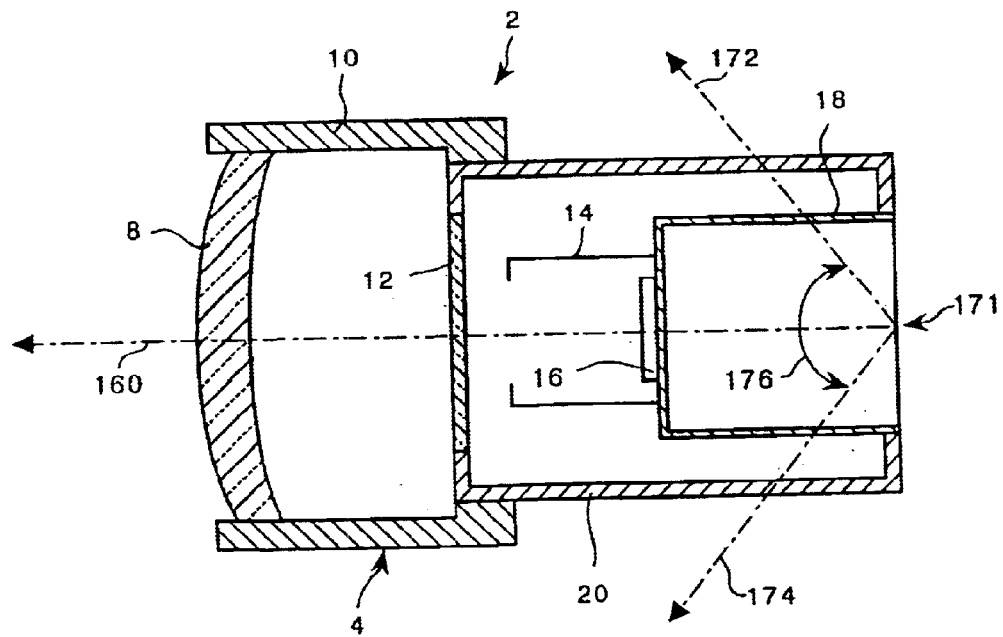
FIG. 24B is a diagram showing view axis scanning.

FIG. 24A is an explanatory diagram used for describing view axis scanning in the vertical direction. On the other hand, FIG. 24B is a diagram showing view axis scanning in the horizontal direction. As shown in FIG. 24A, by rotating the camera head 2 in the up and down directions with a horizontally oriented axis 162 taken as the center of rotation, a view axis 160 scans a range 168 between arrows 164 and 166 in the vertical direction. As shown in FIG. 24B, by rotating the camera head 2 in the horizontal direction with an axis 171 taken as the center of rotation, a view axis 160 scans a range 176 between arrows 172 and 174 in the horizontal direction. The axis 171 is set vertically in a direction normal to the axis 162. The scanning unit 150 drives the view axis 160 in a scanning movement by periodically moving the view axis 160 in the horizontal and vertical directions over a fixed range. The view axis scanning is carried out merely to obtain a partially uniform scene. For example, the periodical scanning movement is carried out at a frequency of 1 Hz to form a circular scanning range with a scanning radius equivalent to that of the field of view of the image-taking unit.

Figure 25:
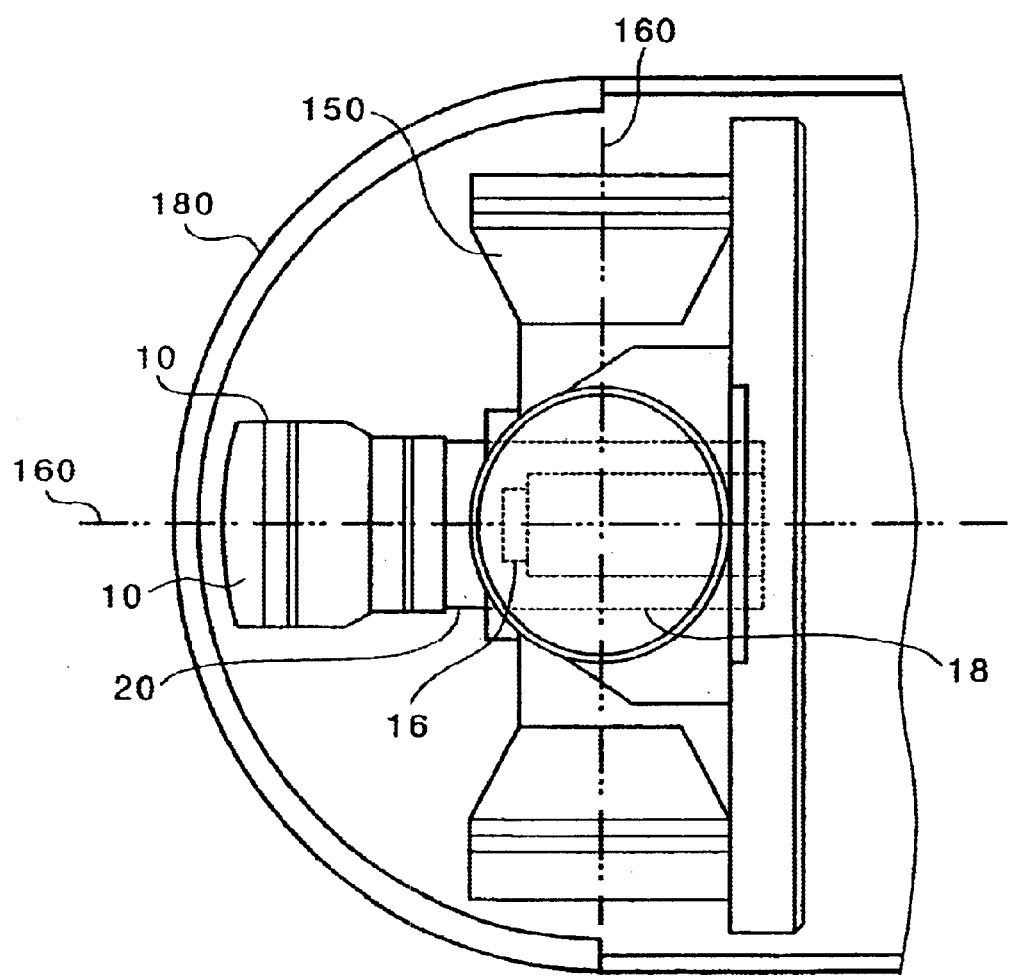
FIG. 25 is a diagram showing a typical scanning unit.

FIG. 25 is a diagram showing a typical configuration of the scanning unit 150 employed in the infrared imaging apparatus. The figure shows a horizontal cross section which is obtained for a case in which the infrared imaging apparatus is mounted on a missile seeker. As shown in FIG. 25, the camera head 2 is accommodated in a dome 180 made of an infrared-transparent material and used for protecting the camera head 2. The camera head 2 is driven into a vertical-direction scanning movement centered at an axis 162 on a gimbal 150 in a horizontal direction to put the view axis 160 in a vertical-direction scanning movement. Much like the axis 162 shown in FIG. 25, another axis is put on the gimbal 150, being oriented in a vertical direction. The camera head 2 is driven into a horizontal-direction scanning movement centered at the other axis to put the view axis 160 in a horizontal-direction scanning movement.

Figure 26:
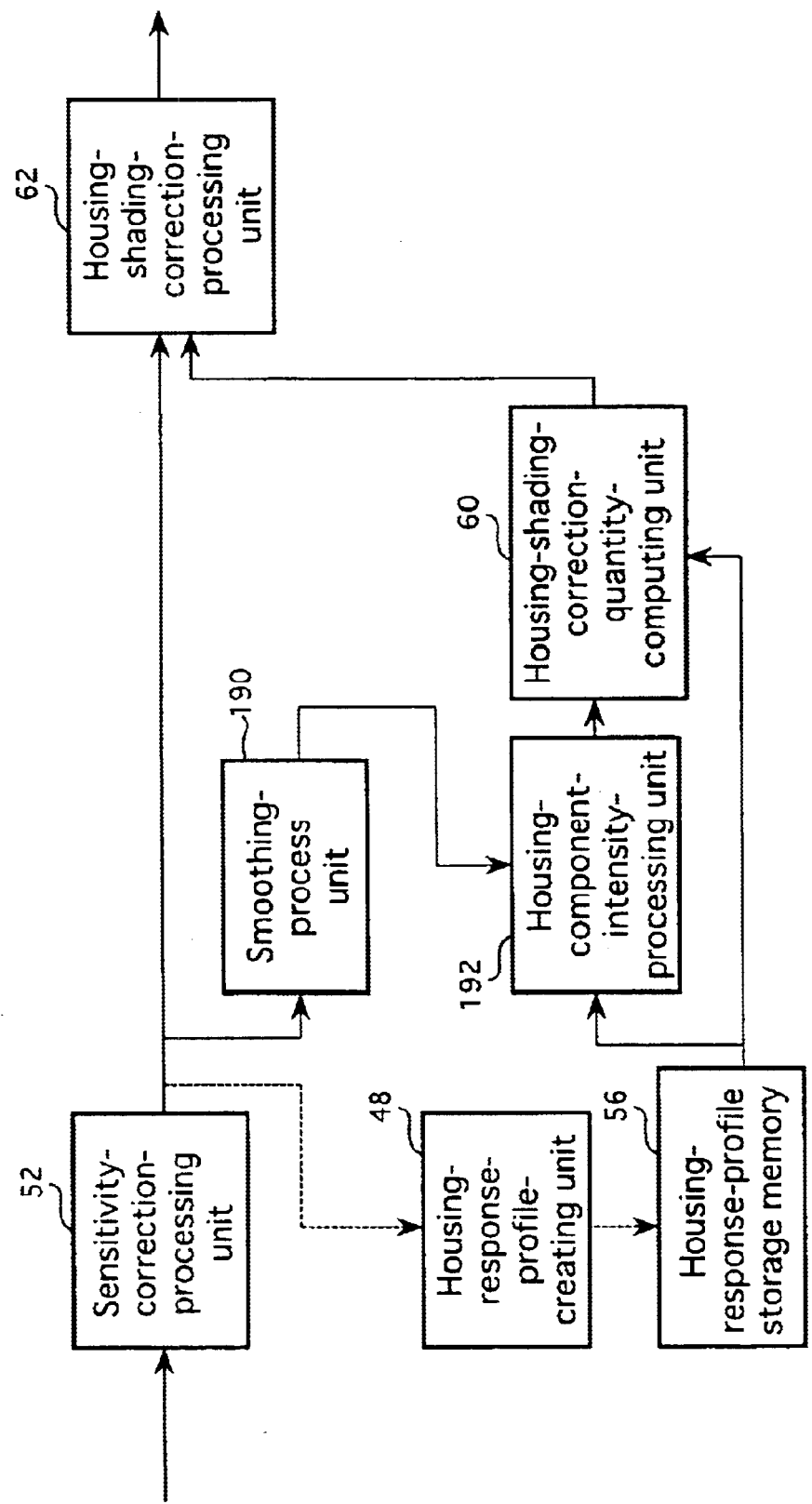
FIG. 26 is a diagram showing the configuration of a shading-correction unit employed in the infrared imaging apparatus shown in FIG. 23.

FIG. 26 is a diagram showing the configuration of the shading-correction unit 152 employed in the infrared imaging apparatus shown in FIG. 23. Configuration elements of the shading-correction unit 152 shown in FIG. 26, that are essentially identical with those employed in the shading-correction unit 42 shown in FIG. 3, are denoted by the same reference numerals as the latter. As shown in FIG. 26, the shading-correction unit 152 has a smoothing-process unit 190 in addition to the configuration elements employed in the shading-correction unit 42. The shading-correction unit 152 is different from the shading-correction unit 42 shown in FIG. 3 in that, in the case of the shading-correction unit 152, the housing-component-intensity-processing unit 192 computes the intensity of a housing component not for corrected-intensity picture data output by the sensitivity-correction-processing unit 52, but for picture data output by the smoothing-process unit 190.

The smoothing-process unit 190 computes integrated picture data by integration of corrected-sensitivity picture data with respect to detector elements i over a predetermined number of frames and computes averaged picture data from the integrated picture data, supplying the averaged picture data to the housing-component-intensity-processing unit 58. Since the picture data is obtained as a result of a scanning operation by scanning a view axis, the integrated and averaged picture data obtained as a result of a smoothing operation for detector elements i becomes an average value of pieces of picture data in the scanning range of the view axis. This processing is thus equivalent to an operation to find an average and uniform value of scene components incident to the detector elements i, making it possible to obtain picture data of a locally uniform scene. The smoothing operation is carried out for typically frames appearing in a time equal to the period of the view axis scanning. If the period of the view axis scanning is 1 second for a frame frequency of 100 Hz, 100 frames appear during the period of 1 second, for example, the smoothing operation is integration of picture data over a period of 1 second and division of the integration result by the number of frames appearing during the period. If the number of frames to be smoothed is a power of 2, the division can be implemented by a bit-shift operation which is simple processing. The integrated and averaged data is updated each smoothing time.

Figure 27:
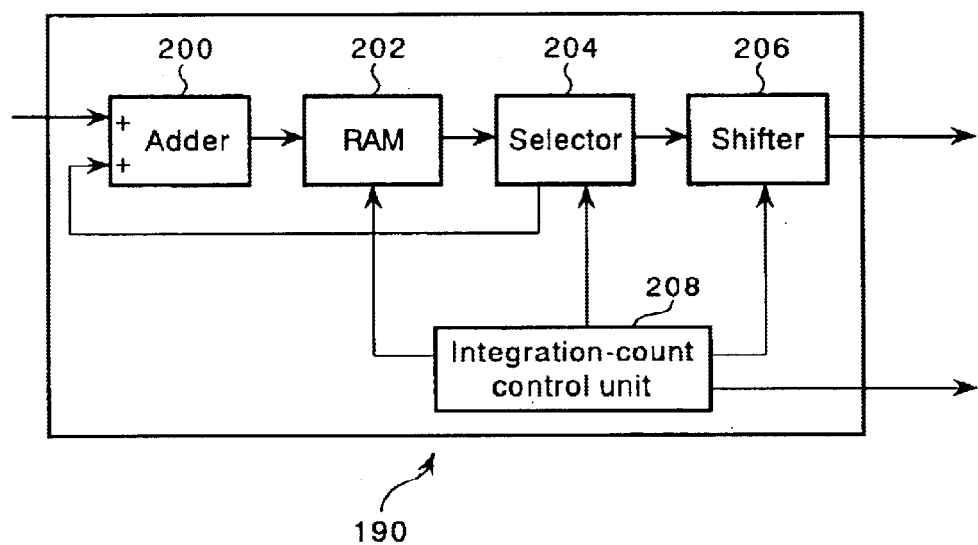
FIG. 27 is a diagram showing a smoothing-process unit employed in the shading-correction unit shown in FIG. 26.

FIG. 27 is a diagram showing the smoothing-process unit 190 employed in the shading-correction unit 152 shown in FIG. 26. As shown in FIG. 27, the smoothing-process unit 190 comprises an adder 200, a RAM 202, a selector 204, a shifter 206 and an integration-count control unit 208. The adder 200 cumulatively adds or integrates corrected-sensitivity picture data MDOALLi output by the sensitivity-correction-processing unit 52 for each detector element i to data output by the selector 204 and outputs the sum to the RAM 202. The RAM 202 is a memory for storing picture data obtained as a result of integration of pieces of corrected-sensitivity picture data MDOALLI with respect to the detector element i over a plurality of frames. The selector 204 supplies integrated picture data to either the adder 200 or the shifter 206 in dependence on a select signal output by the integration-count control unit 208. The shifter 206 carries out a bit-shift operation on the integrated picture data received from the selector 204 in accordance with a command issued by the integration-count control unit 208 in order to divide the level of the picture data by a power of 2. The shifter 206 outputs integrated and averaged picture data as a result of the bit-shift operation. The integration-count control unit 208 carries out the following operations synchronously with frames of corrected-sensitivity picture data and with outputs of each detector element:

1: Clear data stored in the RAM 202 for each predetermined number of frames.
2: Output a read address for corrected-sensitivity picture data MDOALLi input by the adder 200 for each detector element i to the RAM 202 for use by the selector 204 to read integrated data from the RAM 202.
3: Output a write address for corrected-sensitivity picture data MDOALLi input by the adder 200 for each detector element i to the RAM 202 for use by the adder 200 to write a sum into the RAM 202.

4: Output a select signal to the selector 204 to output integrated picture data to the adder 200 during a period of integration or to output integrated picture data to the shifter 206 at the end of a period of integration.

5: Output a control signal indicating that integrated and averaged picture data is being output to the housing-component-intensity-processing unit 192.

It should be noted that, also as an embodiment of the present invention, there is provided a smoothing method for repeatedly carrying out an operation to integrate pieces of picture data over a predetermined plurality of frames and to take an average of integration results. Other methods include the so-called moving-averaging technique or the so-called exponential-smoothing technique. It is needless to say that any method can be adopted as long as the method is capable of smoothing picture data along the time axis for each detector element.

The housing-component-intensity-processing unit 192 computes a housing-component intensity Ih from integrated and averaged picture data for predetermined detector elements i synchronously with a control signal generated by the smoothing-process unit 190 to indicate that the integrated and averaged picture data output by the smoothing-process unit 190 is available. The housing-component-intensity-processing unit 192 then outputs the housing-component intensity Ih to the housing-shading-correction-quantity-computing unit 60.

The operation of the infrared imaging apparatus shown in FIG. 23 is described as follows.

Sensibility-correction calibration data and housing response profiles are created in the same way as the first embodiment.

(a) Scanning Field of View

The infrared imaging apparatus applied to a variety of fields including a missile seeker puts the view axis of the camera head 2 in a scanning movement at a fixed period by using the scanning unit 150 such as a gimbal. At a frequency of about 1 Hz, for example, the view axis is put in a scanning movement along a circular locus with a scanning radius equivalent to that of the field of view of the infrared imaging apparatus. It should be noted that, in a missile seeker, a gimbal serving as the scanning unit 150 is provided for orienting the view axis in the target direction or driving the view axis to track the target. It is possible to carry out the operation to drive the view axis in a scanning movement for obtaining a locally uniform scene continuously or intermittently in parallel to operations to search for a target and to follow up the target or other operations. As long as shading components caused by the housing do not vary due to changes in temperature of the camera head 2, because it is not necessary to compute shading components caused by the housing, there is no problem with the time of view axis scanning even if the view axis scanning is carried out intermittently. Picture data obtained as a result of a scanning operation carried out by the scanning unit 150 using the view axis of the camera head 2 is converted by the AD converter 40 into digital picture data which is then supplied to the sensitivity-correction-processing unit 52.

(b) Sensitivity Correction

Much like the first embodiment, the sensitivity-correction-processing unit 52 carries out sensitivity correction on the digital picture data, outputting corrected-sensitivity picture data for each detector element i to the smoothing-process unit 190 and the housing-shading-correction-processing unit 62.

(c) Smoothing Process

The smoothing-process unit 190 integrates the signals every the detector element i outputted by the elements over a predetermined number of frames before an averaging process by bit-shifting of a result of integration. The smoothing-process unit 190 then outputs the integrated and averaged picture data to the housing-component-intensity-processing unit 192. The smoothing-process unit 190 also supplies a control signal to the housing-component-intensity-processing unit 192 to indicate that the integrated and averaged picture data is available. Since the input picture data is obtained as a result of a scanning operation using a view axis, the integrated and averaged picture data with respect to detector elements is equivalent to a locally uniform scene.

(d) Housing Component Intensity Processing

The housing-component-intensity-processing unit 192 computes a housing-component intensity Ih from integrated and averaged picture data for predetermined detector elements i synchronously with a control signal generated by the smoothing-process unit 190 to indicate that the integrated and averaged picture data output by the smoothing-process unit 190 is available in the same way as the first embodiment. The housing-component-intensity-processing unit 192 then outputs the housing-component intensity Ih to the housing-shading-correction-quantity-computing unit 60. Since the integrated and averaged picture data represents a locally uniform scene, the housing-component intensity Ih can be computed with a high degree of accuracy in comparison with the first embodiment.

(e) Housing Shading Correction Quantity Computing

The housing-shading-correction-quantity-computing unit 60 multiplies the housing response profile PROFi by the housing-component intensity Ih for each detector element i to compute a housing shading correction quantity. The housing response profile PROFi is stored in the housing-response-profile storage memory 56 for all detector elements i of the infrared sensor 16. The housing-shading-correction-quantity-computing unit 60 supplies the housing shading correction quantity to the housing-shading-correction-processing unit 62.

(f) Housing Shading Correction

The housing-shading-correction-processing unit 62 subtracts the housing shading correction quantity from the corrected-intensity picture data for each detector element i and outputs the difference resulting from the subtraction to the image-processing unit 44.

(g) Image Processing

The image-processing unit 44 receives picture data completing correction of shading components caused by the optical system and correction of shading components caused by the housing in the shading-correction unit 152, carrying out image processing on the received picture data. The image-processing unit 44 then displays results of the image processing on a display unit or the like. At that time, the image data is performed the same correction of shading components caused by the optical system as the first embodiment and more accurate correction of shading components caused by the housing than the first embodiment. As a result, the picture quality is improved better than the first embodiment.

Third Embodiment

Figure 28:
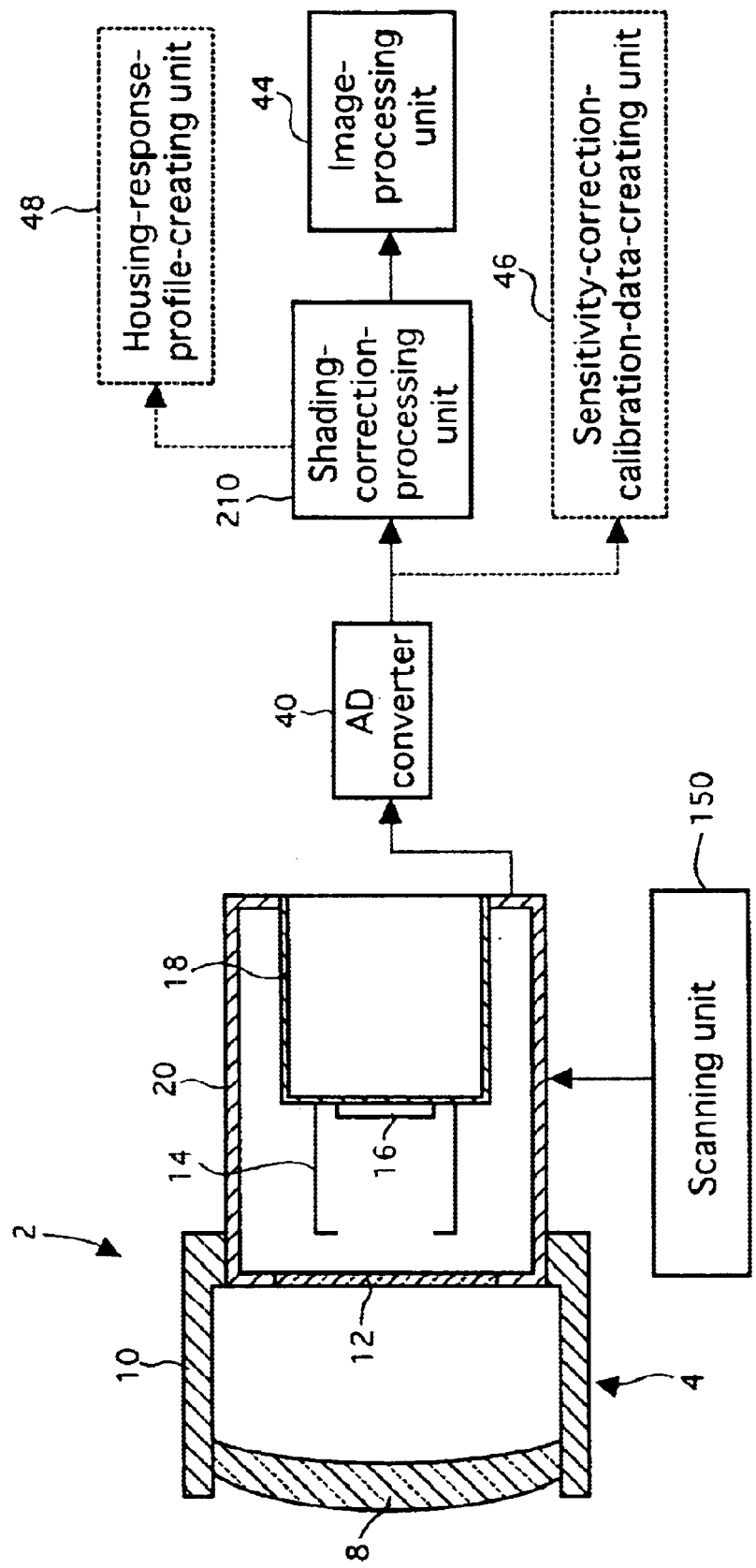
FIG. 28 is a diagram showing the configuration of an infrared imaging apparatus implemented by a third embodiment of the present invention.

FIG. 28 is a diagram showing the configuration of an infrared imaging apparatus implemented by a third embodiment of the present invention. Configuration elements of the third embodiment, that are essentially identical with those employed in the second embodiment shown in FIG. 23, are denoted by the same reference numerals as the latter. The correction of variations in characteristics of detector elements by the sensitivity-correction-processing unit 56 in the first and second embodiments is generally correction of variations in basic characteristic that are not accompanied by a change in characteristic-variation with the lapse of time. In the case of the third embodiment, on the other hand, a shading-correction unit 210 corrects variations in characteristic with a time lapse, which change in the course of operation, by carrying out offset correction.

Figure 29:
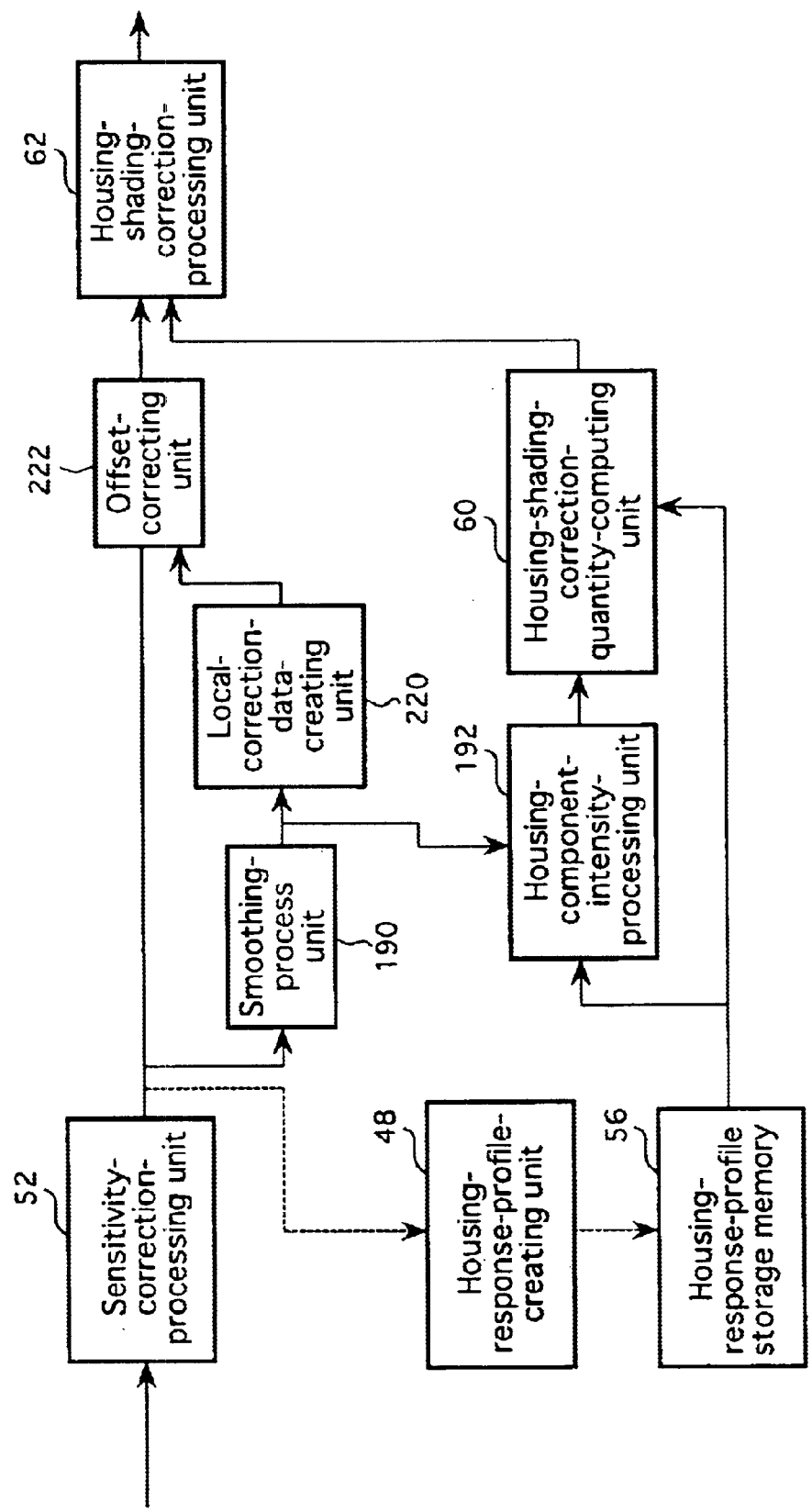
FIG. 29 is a diagram showing the configuration of a shading-correction unit employed in the infrared imaging apparatus shown in FIG. 28.

FIG. 29 is a diagram showing the configuration of the shading-correction unit 210 employed in the infrared imaging apparatus shown in FIG. 28. Configuration elements of the shading-correction unit 210, that are essentially identical with those employed in the shading-correction unit 152 shown in FIG. 26, are denoted by the same reference numerals as the latter. A local-correction-data-creating unit 220 carries out the following pieces of processing on integrated and averaged picture data generated by the smoothing-process unit 190 for detector elements i:

1: Compute an average value for devices surrounding a detector element i.
2: Subtract the picture-data level of a detector element i from the average value for surrounding devices and output the difference resulting from the subtraction to an offset-correcting unit 222 as an offset calibration value for the detector element i.

A locally uniform scene can be obtained from the smoothing-process unit 190. Thus, variations in characteristic, which are caused with the lapse of time, are corrected by using the offset calibration value because the difference between the average value of surrounding devices and the detector element i of interest is regarded as characteristic variations caused by the lapse of time.

Figure 30:
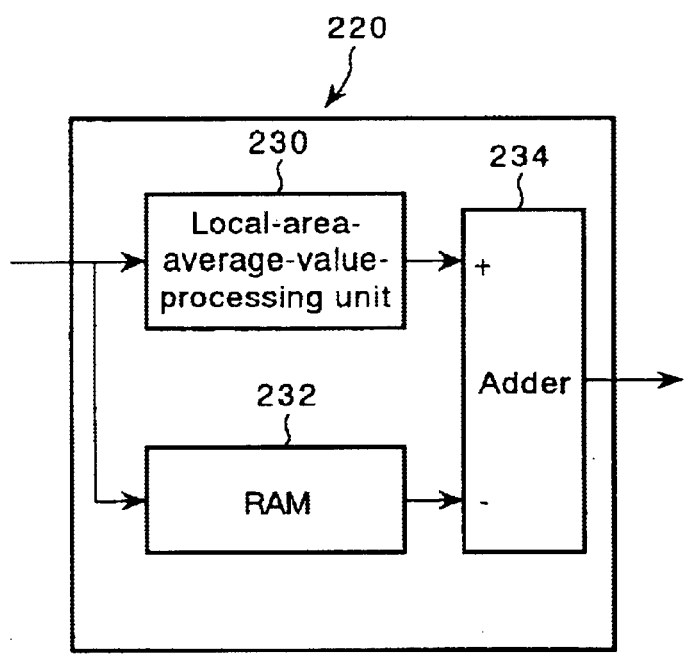
FIG. 30 is a diagram showing the configuration of a local-correction-data-creating unit employed in the shading-correction unit shown in FIG. 29.

FIG. 30 is a diagram showing the configuration of the local-correction-data-creating unit 220 employed in the shading-correction unit 210 shown in FIG. 29. As shown in FIG. 30, the local-correction-data-creating unit 220 comprises a local-area-average-value-processing unit 230, a RAM 232 and an adder 234. The local-area-average-value-processing unit 230 computes an average value for devices surrounding a detector element i. Such an average value is also referred to hereafter as a local-area average value. Detector elements surrounding a particular detector element are located in a local area with the particular detector element serving as the center of the area. For example, the local area has dimensions of 11 elements×11 elements. The RAM 232 is a memory for storing integrated and averaged picture data of all detector elements i. The adder 234 reads an integrated and averaged picture data of all detector elements i from the RAM 232, and subtracts the integrated and averaged picture data of all detector elements i from an average value for devices surrounding a particular detector element i to output a correction calibration quantity for the particular detector element i. The integrated and averaged picture data is to be subtracted from the average value as described above.

Figure 31:
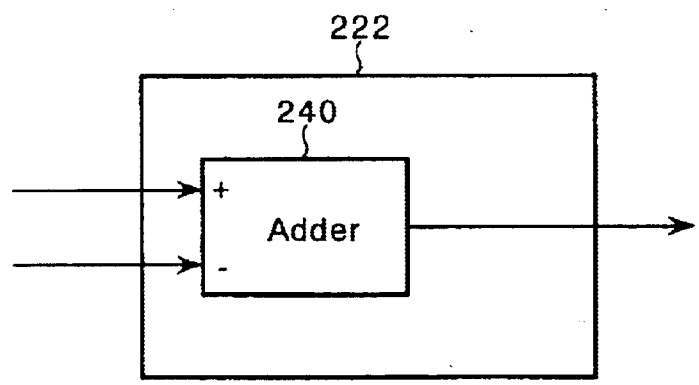
FIG. 31 is a diagram showing the configuration of an offset-correction unit employed in the shading-correction unit shown in FIG. 29.

FIG. 31 is a diagram showing the configuration of an offset-correction unit 222 employed in the shading-correction unit shown in FIG. 29. As shown in FIG. 31, the offset-correction unit 222 has an adder 240. The adder 240 adds corrected-sensitivity picture data of a detector element i to correction calibration data for the detector element i in order to correct characteristic variations caused by the lapse of time.

The operation of the infrared imaging apparatus shown in FIG. 28 is described as follows.

Sensibility-correction calibration data and housing response profiles are created in the same way as the first embodiment.

(a) Scanning Field of View

Much like the second embodiment, the infrared imaging apparatus puts the view axis of the camera head 2 in a scanning movement at a fixed period by using the scanning unit 150 such as a gimbal. Picture data obtained as a result of a scanning operation carried out by the scanning unit 150 using the view axis of the camera head 2 is converted by the AD converter 40 into digital picture data which is then supplied to the sensitivity-correction-processing unit 52.

(b) Sensitivity Correction

Much like the first embodiment, the sensitivity-correction-processing unit 52 carries out sensitivity correction on the digital picture data, outputting corrected-sensitivity picture data for each detector element i to the smoothing-process unit 190 and the housing-shading-correction-processing unit 62.

(c) Smoothing

Much like the second embodiment, after the smoothing-process unit 190 integrates the corrected-sensitivity picture data with respect to the detector element i over a predetermined number of frames, it performs an averaging process by bit-shifting of a result of integration. The smoothing-process unit 190 then outputs the integrated and averaged picture data to the housing-component-intensity-processing unit 192 and the local-correction-data-creating unit 220.

(d) Local Correction Data Creating

The local-correction-data-creating unit 220 computes a local-area average value for detector elements i. For each detector element i, the local-correction-data-creating unit 220 calculates a correction calibration quantity by using the local-area average value for detector elements i.

(e) Local Correction Data Creating

The C unit 222 adds corrected-sensitivity picture data for each detector element i to the correction calibration quantity of the detector element i to correct variations in characteristic of the corrected-sensitivity picture data, which are caused by the lapse of time.

(f) Housing Component Intensity Processing

Much like the second embodiment, the housing-component-intensity-processing unit 192 computes a housing-component intensity Ih from integrated and averaged picture data for detector elements in a predetermined area, and outputs the computed housing-component intensity Ih to the housing-shading-correction-quantity-computing unit 60. It should be noted that, instead of supplying integrated and averaged data obtained as a result of integration and averaging by the smoothing-process unit 190 to the housing-component-intensity-processing unit 192, picture data completing offset correction in the offset-correction unit 222 can also be subjected to the same integration and averaging as the processes carried out by the smoothing-process unit 190 to produce integrated and averaged picture data.

(g) Housing Shading Correction Quantity Computing

The housing-shading-correction-quantity-computing unit 60 multiplies the housing response profile PROFi by the housing-component intensity Ih for each detector element i to compute a housing shading correction quantity. The housing response profile PROFi is stored in the housing-response-profile storage memory 56 for all detector elements i of the infrared sensor 16. The housing-shading-correction-quantity-computing unit 60 supplies the housing shading correction quantity to the housing-shading-correction-processing unit 62.

(h) Housing Shading Correction Processing

The housing-shading-correction-processing unit 62 subtracts the housing shading correction quantity from the corrected-offset picture data for each detector element i, and outputs the difference resulting from the subtraction to the image-processing unit 44.

(i) Image Processing

The image-processing unit 44 receives picture data completing correction of shading components caused by the optical system, correction characteristic variations caused by the lapse of time and correction of shading components caused by the housing in the shading-correction unit 210, carrying out image processing on the received picture data. The image-processing unit 44 then displays results of the image processing on a display unit or the like. At that time, the picture data has completed the correction of shading components caused by the optical system, the correction characteristic variations caused by the lapse of time and the correction of shading components caused by the housing. As a result, the picture quality is further improved.

In accordance with the present invention, since shading components caused by the optical system and shading components caused by the housing are corrected, the picture quality is improved.

The present invention is not limited to the details of the preferred embodiments described above. The scope of the present invention is defined by appended claims and all changes and modifications as fall within the equivalence of the scope of the claims are therefore to be embraced by the invention.

What is claimed is:

1. An infrared imaging apparatus for carrying out shading correction of picture data obtained as a result of an image-taking process using a camera head comprising an optical system, a plurality of detector elements and a container for accommodating said detector elements, said infrared imaging apparatus comprising:

a first correction unit for creating corrected-sensitivity picture data by correction of shading components caused by said optical system to produce uniform scene components included in said picture data obtained as a result of an image-taking process of a uniform scene;

a storage unit for storing a housing response profile for correcting a housing-shading component caused by infrared rays radiated by said optical system and said container for each of said detector elements; and a second correction unit for estimating housing-shading components contained in said corrected-sensitivity picture data based on said corrected-sensitivity picture data received from said first correction unit and said housing response profile for each of said detector elements received from said storage unit, and creating corrected-housing-shading picture data by correction of said housing-shading components, wherein said housing response profile for each of said detector elements is a value based on a first differential data between a first and a second picture data for said detector element where:

said first picture data is picture data taken by setting a black-body-radiator at a first temperature placed in front of said camera head and setting said camera head at a second temperature; whereas said second picture data is picture data taken by setting said black-body-radiator at said first temperature placed in front of said camera head and setting said camera head at a third temperature.

2. An infrared imaging apparatus according to claim 1 wherein:

a product of a first constant found and a housing response profile for each of said detector elements is a housing component for each of said detector elements;

and wherein said second correction unit includes a unit for subtracting a product of a housing response profile for each of said detector elements and constant from corrected-sensitivity picture data for each of said detector elements.

3. An infrared imaging apparatus according to claim 1 wherein, for each of said detector elements, said corrected-sensitivity picture data of any particular one of said detector elements is a sum of a housing-shading component and a second constant representing a scene component where said housing-shading component is a product of a first constant and said housing response profile for said particular detector element; and wherein said the second correction unit includes a unit for computing said first constant's value that minimizes a total obtained by summing the square of a difference of said sum from said corrected-sensitivity picture data related to the detector elements.

4. An infrared imaging apparatus according to claim 3 wherein said housing response profile is data with no physical dimensions.

5. An infrared imaging apparatus according to claim 4 wherein said second correction unit is configured to change said first and second constants in accordance with an average value of pieces of corrected-sensitivity picture data for a plurality of said detector elements in a predetermined area.

6. An infrared imaging apparatus according to claim 1 wherein said housing response profile is a value based on a ratio of said first differential data to a second differential data between third and fourth picture data where:

said third picture data is picture data taken by setting said black-body-radiator placed in front of said camera head at said second temperature and setting said camera head at said first temperature; whereas said fourth picture data is picture data taken by setting said black-body-radiator at said third temperature in front of said camera head and setting said camera head at said first temperature.

7. An infrared imaging apparatus according to claim 1 wherein said first correction unit is configured to correct shading components caused by said optical system in accordance with sensitivity-correction calibration data based on third picture data and fourth picture data where:

said third picture data is picture data taken by setting said camera head at a predetermined temperature and setting a black-body placed in front of said camera head at a third temperature; whereas said fourth picture data is picture data taken by setting said camera head at said predetermined temperature and setting said black-body-radiator at a fourth temperature.

8. An infrared imagine apparatus according to claim 2, further comprising:

a scanning unit for putting a view axis of said camera head in a scanning movement; and a smoothing-process unit for creating smoothed picture data by carrying out integration and averaging processes on pieces of corrected-sensitivity picture data for detector elements of an infrared detector, wherein said second correction unit computes said first constant on the basis of said smoothed picture data.

9. An infrared imaging apparatus according to claim 7 wherein said sensitivity-correction calibration data is a first average value and an offset-correction calibration data based on gain-correction calibration data representing a ratio of a second difference to a first difference and based on said third picture data for said detector elements where:

said first difference is a difference between said first average value of said third picture data of said detector elements and a second average value of said fourth picture data of said detector elements; whereas said second difference is a difference between said third picture data of said detector elements and said fourth picture data of said detector elements.

10. An infrared imaging apparatus according to claim 1, further comprising:

a smoothing-process unit for creating smoothed picture data by carrying out integration and averaging processes on pieces of corrected-sensitivity picture data for detector elements of an infrared detector; and a third correction unit for correcting corrected-sensitivity picture data of any particular one of said detector elements on the basis of a difference between said smoothed picture data created by carrying out said integration and averaging processes on pieces of corrected-sensitivity picture data for detector elements surrounding said particular detector element and an average value of said smoothed data.

11. An infrared imaging apparatus according to claim 1, further comprising a housing response profile creating unit for creating said housing response profile.

* * * * *